(12) United States Patent
Beaufays et al.

(10) Patent No.: US 12,126,845 B2
(45) Date of Patent: Oct. 22, 2024

(54) EPHEMERAL LEARNING OF MACHINE LEARNING MODEL(S)

(71) Applicant: GOOGLE LLC, Mountain View, CA (US)

(72) Inventors: Françoise Beaufays, Mountain View, CA (US); Khe Chai Sim, Dublin, CA (US); Trevor Strohman, Sunnyvale, CA (US); Oren Litvin, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 360 days.

(21) Appl. No.: 17/533,779

(22) Filed: Nov. 23, 2021

(65) Prior Publication Data

US 2023/0156248 A1    May 18, 2023

Related U.S. Application Data

(60) Provisional application No. 63/280,714, filed on Nov. 18, 2021.

(51) Int. Cl.
*H04N 21/233* (2011.01)
*G06F 18/214* (2023.01)
(Continued)

(52) U.S. Cl.
CPC ......... *H04N 21/233* (2013.01); *G06F 18/214* (2023.01); *G06N 20/00* (2019.01); *H04N 21/232* (2013.01)

(58) Field of Classification Search
CPC .......... G06F 3/162; G10L 15/22; G10L 19/04
(Continued)

(56) References Cited

U.S. PATENT DOCUMENTS 11,295,735 B1 *   4/2022   Anuar ................... G10L 15/30
2014/0129226 A1 *  5/2014   Lee ..................... G06F 21/6245
                                              704/E15.005
(Continued)

OTHER PUBLICATIONS

3rd Generation Partnership Project; Technical Specification Group Services and System Aspects; "Study on traffic characteristics and performance requirements for AI/ML model transfer in 5GS (Release 18)" 3GPP Draft; Z_22874-I10_, 3rd Generation Partnership Project (3GPP), retrieved from internet: URL:https://ftp.3gpp.org/tsg_sa/WG1_Serv/TSGS1_95e_EM_August2021/temp_post_SA93_versions/z_22874-i10_.doc (retrieved on Sep. 24, 2021); 111 pages; dated Sep. 24, 2021.

(Continued)

*Primary Examiner* — Alexander Krzystan
(74) *Attorney, Agent, or Firm* — Gray Ice Higdon

(57) ABSTRACT

Implementations disclosed herein are directed to ephemeral learning of machine learning ("ML") model(s) based on gradient(s) generated at a remote system (e.g., remote server(s)). Processor(s) of the remote system can receive stream(s) of audio data capturing spoken utterance(s) from a client device of a user. A fulfillment pipeline can process the stream(s) of audio data to cause certain fulfillment(s) of the spoken utterance(s) to be performed. Meanwhile, a training pipeline can process the stream(s) of audio data to generate gradient(s) using unsupervised learning techniques. Subsequent to the processing by the fulfillment pipeline and/or the training pipeline, the stream(s) of audio data are discarded by the remote system. Accordingly, the ML model(s) can be trained at the remote system without storing or logging of the stream(s) of audio data by non-transient memory thereof, thereby providing more efficient training mechanisms for training the ML model(s) and also increasing security of user data.

19 Claims, 6 Drawing Sheets

(51) Int. Cl.
*G06N 20/00* (2019.01)
*H04N 21/232* (2011.01)

(58) Field of Classification Search
USPC .......................................... 700/94
See application file for complete search history.

(56) References Cited

U.S. PATENT DOCUMENTS

2017/0366637 A1* 12/2017 Bandyopadhyay .......................... H04L 67/5682
2020/0175961 A1    6/2020 Thomson et al.
2023/0274095 A1*  8/2023 Kelkar .................... G06F 40/49
                                                    704/9

OTHER PUBLICATIONS

Edu, J.S. et al., "Smart Home Personal Assistants: A Security and Privacy Review"; arXiv.org, Cornell University Library, arXiv:1903.05593v3; 35 pages; dated Aug. 17, 2020.
European Patent Office; International Search Report and Written Opinion issued in Application No. PCT/US2021/062553; 16 pages; dated Jul. 20, 2022.

* cited by examiner

EPHEMERAL LEARNING OF MACHINE LEARNING MODEL(S)

BACKGROUND

Federated learning of machine learning (ML) model(s) is an increasingly popular ML technique for training ML model(s). In traditional federated learning, an on-device ML model is stored locally on a client device of a user, and a global ML model, that is a cloud-based counterpart of the on-device ML model, is stored remotely at a remote system (e.g., a cluster of servers). The client device, using the on-device ML model, can process user input detected at the client device to generate predicted output, and can compare the predicted output to ground truth output to generate a client gradient. Further, the client device can transmit the client gradient to the remote system. The remote system can utilize the client gradient, and optionally additional client gradients generated in a similar manner at additional client devices, to update weights of the global ML model. The remote system can transmit the global ML model, or updated weights of the global ML model, to the client device. The client device can then replace the on-device ML model with the global ML model, or replace the weights of the on-device ML model with the updated weights of the global ML model, thereby updating the on-device ML model.

However, federated learning of ML model(s) is not well-suited for training ML model(s) in instances where the remote system (e.g., a cluster of servers) is utilized in processing user input detected at the client device. For example, assume a cloud-based automatic speech recognition (ASR) model is utilized to generate closed captioning text for a cloud-based video meeting between multiple users. In this example, the audio data capturing spoken utterances between the multiple users is transmitted between respective client devices of the multiple users over one or more networks and using the remote system, and the closed captioning text is generated at the remote system and transmitted to the respective client devices of the multiple users. Accordingly, the audio data and the closed captioning text may not be considered local to any of the respective client devices, thereby undermining the privacy and security benefits of training ML model(s) using federated learning. As a result, other training techniques are needed that can leverage this data in a private and secure manner.

SUMMARY

Implementations disclosed herein are directed to ephemeral learning of global machine learning (ML) model(s) based on gradient(s) generated at a remote system. Processor(s) of the remote system can receive corresponding streams of client data from a plurality of client devices, utilize a fulfillment pipeline to process the corresponding streams of client data to cause certain fulfillment of the corresponding streams of audio data to be performed, and, in parallel, utilize a training pipeline to process the corresponding streams of client data to generate one or more gradients, for updating one or more global weights of one or more global ML models, using unsupervised learning. Processor(s) of the remote system can further update one or more of the global weights of one or more of the global ML models based on one or more of the gradients generated based on processing the corresponding streams of client data. One or more of the updated global ML models and/or one or more of the updated weights thereof can be transmitted back to one or more of the plurality of client devices. Notably, the corresponding streams of client data are not stored or logged in non-transient memory of the remote system and the corresponding streams of client data are discarded by the remote system subsequent to utilization by the fulfillment pipeline and/or the training pipeline, hence the phrase ephemeral learning.

For example, assume a stream of audio data capturing a spoken utterance of "Hey Assistant, what's the weather?" is generated via one or more microphones of a given client device of a user. In this example, the stream of audio data capturing the spoken utterance (or automatic speech recognition (ASR) data and/or natural language understanding (NLU) data generated based on processing the spoken utterance) may be transmitted to the remote system since the given client device needs to interact with the remote system to obtain weather information that is responsive to the spoken utterance. Accordingly, the remote system can utilize a fulfillment pipeline to cause certain fulfillment to be performed based on the spoken utterance, such as obtaining the weather information and causing the weather information to be provided for presentation to the user via the given client device. Further, while the remote system utilizes the fulfillment pipeline to cause the certain fulfillment to be performed based on the spoken utterance, the training pipeline can also process the stream of audio data, the ASR data, and/or the NLU data. For instance, the training pipeline can process the stream of audio data in instances where the global ML model to be trained is a global ASR model, ASR data (e.g., generated locally at the given client device and transmitted to the remote system, or generated remotely at the remote system) in instances where the global ML model to be trained is a global NLU model, and so on. Further, one or more gradients can be generated based on processing the client data and using unsupervised learning, and one or more global weights of the global ML model can be updated based on one or more of the gradients. The updated global ML model (or one or more of the global weights thereof) can be transmitted back to the given client device, and the given client device can replace a corresponding on-device ML model (or one or more local weights thereof) in on-device memory of the given client device. Notably, an instance of the updated global ML model can also remain at one or more of the remote servers to be subsequently utilized by the fulfillment pipeline to process additional corresponding streams of client data and/or the training pipeline to further update the updated global ML model.

Although the above example is described with respect to the client data being audio data capturing the spoken utterance of the user, it should be understood that is for the sake of example and is not meant to be limiting. For instance, the client data can additionally, or alternatively, include vision data or textual data generated at the given client device. In these and other instances, one or more of the global ML models to be updated based on the client data may correspond to vision-based ML models and/or text-based ML models. Further, although the above example is described with respect to the global ML model being an ASR model, it should be understood that is also for the sake of example and is not meant to be limiting. For instance, the global ML model can include a global hotword detection model that is trained to predict whether the stream of audio data captures a particular word or phrase, a global voice activity detection (VAD) model trained to predict whether voice activity of a human is captured in the stream audio data, and/or any other audio-based ML model.

In some implementations, the unsupervised learning utilized to generate one or more of the gradients can correspond to semi-supervised learning, such as a teacher-student approach. For example, one or more predicted outputs can be generated by the remote system based on processing the client data using one or more global ML models. Further, one or more benchmark outputs can be generated by the remote system based on processing the client data using one or more of global benchmark models. In this example, the one or more benchmark global ML models may be of a same type as one or more of the global ML models, and one or more of the benchmark outputs may be utilized as a supervision signal for generating one or more of the gradients. For instance, one or more of the global benchmark ML models may correspond to a global benchmark ASR model that is utilized to generate one or more of the benchmark ML models based on processing a stream of audio data. Further, one or more of the global ML models may correspond to a distinct, global ASR model that is utilized to generate one or more of the predicted outputs based on processing the stream of audio data. In this instance, one or more of the benchmark outputs may be compared to one or more of the predicted outputs to generate one or more gradients, and the distinct, global ASR model that is utilized to generate one or more of the predicted outputs may be updated based on one or more of the gradients.

In some versions of those implementations, one or more of the predicted outputs may only be generated using one or more of the global ML models and/or one or more of the gradients may be utilized in updating one or more of the global ML models in response to determining that one or more conditions are satisfied. The one or more conditions can include, for example, whether one or more of the predicted outputs satisfy a predicted output threshold, one or more of the benchmark outputs satisfy a benchmark output threshold, and/or other conditions. Put another way, one or more of the predicted outputs may only be generated using one or more of the global ML models and/or one or more of the gradients may be utilized in updating one or more of the global ML models in response to determining that one or more of the benchmark outputs provide a sufficient supervision signal for updating one or more of the global ML models.

In additional or alternative implementations, the unsupervised learning utilized to generate one or more of the gradients can correspond to self-supervised learning. In self-supervised learning, a target portion of client data may be identified. The target portion of the client data may be subsequent to a prepended portion of the client data and may be prior to an appended portion of the client data. Further, the target portion of the client data may be masked using various masking techniques. The target portion of the client data may be selected arbitrarily, or selected based on one or more criteria such as a particular segment between n and m seconds of audio data corresponds to the target portion, a portion of vision data corresponding to a center portion of an image corresponds to the target portion, a center portion of textual data corresponds to the target portion, and/or any other criteria for selecting the target portion of the client data. In some implementations where the client data corresponds to a stream of audio data, the target portion of the client data may correspond to a target audio waveform portion of the corresponding stream of audio data, the prepended portion of the client data may correspond to a prepended audio waveform portion that is received prior to the target audio waveform portion, and the appended portion of the client data may correspond to an appended audio waveform portion that is received subsequent to the target audio waveform portion.

In additional or alternative implementations where the client data corresponds to a stream of audio data, the client data may correspond to a representation of the corresponding stream of audio data (e.g., received from one or more of the client devices as the client data and/or generate at one or more of the remote servers), such as a vector representation of the corresponding stream of audio data, ASR data generated based on processing the corresponding stream of audio data, and/or other representations of the audio data. In these implementations, the target portion of the client data may correspond to a target representation portion of the corresponding stream of audio data, the prepended portion of the client data may correspond to a prepended representation portion that precedes the target representation portion, and the appended portion of the client data may correspond to an appended representation portion that follows subsequent to the target representation portion. In additional or alternative implementations, the client data may correspond to textual data or vision data. In these implementations, the target portion, the prepended portion, and the appended portion may be identified in the same or similar manner, and the target portion may be masked.

In implementations where the unsupervised learning utilized to generate one or more of the gradients corresponds to self-supervised learning, the prepended portion of the client data and the appended portion of the client data may be processed using one or more of the global ML models to generate one or more predicted outputs that predict the target portion of the client data. For example, in implementations where the target portion of the client data corresponds to the target audio waveform portion of the corresponding stream of audio data, further assume the audio data captures a spoken utterance. In this example, the prepended audio waveform portion and the appended audio waveform portion may be processed using a global ASR model to generate one or more predicted outputs. In this example, one or more of the predicted outputs may correspond to a predicted target audio waveform that is predicted to correspond to the target audio waveform portion. Put another way, the self-supervised learning technique may attempt to reconstruct the target audio waveform portion based on processing the prepended audio waveform portion and the appended audio waveform portion. Notably, in implementations where the global ASR model is utilized to reconstruct the target audio waveform portion, the global ASR model may be a multilingual ASR model since a primary language of a given client device that provided the corresponding stream of audio data may be irrelevant to reconstructing the target audio waveform portion. However, in various implementations, the prepended audio waveform portion and the appended audio waveform portion may be processed using one or more global ASR models that are specific to the primary language of the given client device that provided the corresponding stream of audio data.

Also, for example, in implementations where the target portion of the client data corresponds to the target representation portion of the corresponding stream of audio data, further assume the audio data captures a spoken utterance. In this example, the prepended representation portion and the appended representation portion may be processed using a global ASR model and/or a global NLU model to generate one or more of the predicted outputs. In this example, one or more of the predicted outputs may correspond to a predicted target representation that is predicted to correspond to the target representation portion. Put another way, the self-supervised learning technique may attempt to reconstruct the target representation portion based on processing the prepended representation portion and the appended representation portion.

Further, in implementations that utilize the self-supervised, one or more of the predicted outputs may be compared to the target portion to generate one or more of the gradients. Put another way, the system may utilize the actual target portion of the client data that was masked as a supervision signal with which one or more of the predicted outputs that are predicted to correspond to the target portion. Further, based on the comparison, one or more of the gradients may be generated and utilized to update one or more of the global ML models.

In various implementations, and prior to processing the client data to generate one or more of the predicted outputs, the client data may be routed through one or more buffers to ensure that the client data is processed by the appropriate global ML model(s). In some implementations, the one or more buffers can be utilized to tag the client data based on a primary language of a given client device and/or based on a geographical region of the given client device. In these implementations, different instances of the global ML model(s) can be updated based on the different primary languages and/or the geographical regions. For example, if the primary language of the given client device is English, then the client data can be tagged with an "English" tag and processed using global ML model(s) that is specific to the English language. However, if the primary language of the given client device is French, then the client data can be tagged with a "French" tag and processed using global ML model(s) that is specific to the French language. Additionally, or alternatively, if the geographical region of the given client device is the Southeastern United States, then the client data can be tagged with a "Southeastern United States" tag and processed using global ML model(s) that is specific to the Southeastern United States. However, if the geographical region of the given client device is Germany then the client data can be tagged with a "Germany" tag and processed using global ML model(s) that is specific to Germany. In these implementations, the different primary languages and/or the geographical regions based on metadata transmitted to the remote system from one or more of the client devices along with the client data. In some versions of those implementations, the one or more buffers can be utilized to pre-process the client data for purposes of updating the appropriate global ML model(s). For example, the remote system can utilize one or more of the buffers to re-sample or segment the client data.

By using the techniques described herein, various technical advantages can be achieved. As one non-limiting example, in utilizing the ephemeral learning technique described herein, one or more of the global ML models can be updated based on data that would not otherwise be available training without potentially compromising security of the client data, thereby increasing precision and/or recall of one or more of the global ML models while preserving security of the client data. For example, the remote system can generate one or more of the gradients while the client data is available to the remote system, and without storing or logging the client data in transient memory available to the remote system that, absent these techniques, may not be utilized to update one or more of the global ML models due to privacy considerations. As a result, when the corresponding global ML models (or weights thereof) are deployed to client devices, the on-device ML models are also more robust and have greater precision and/or recall.

The above description is provided as an overview of some implementations of the present disclosure. Further description of those implementations, and other implementations, are described in more detail below.

DETAILED DESCRIPTION

Figure 1:
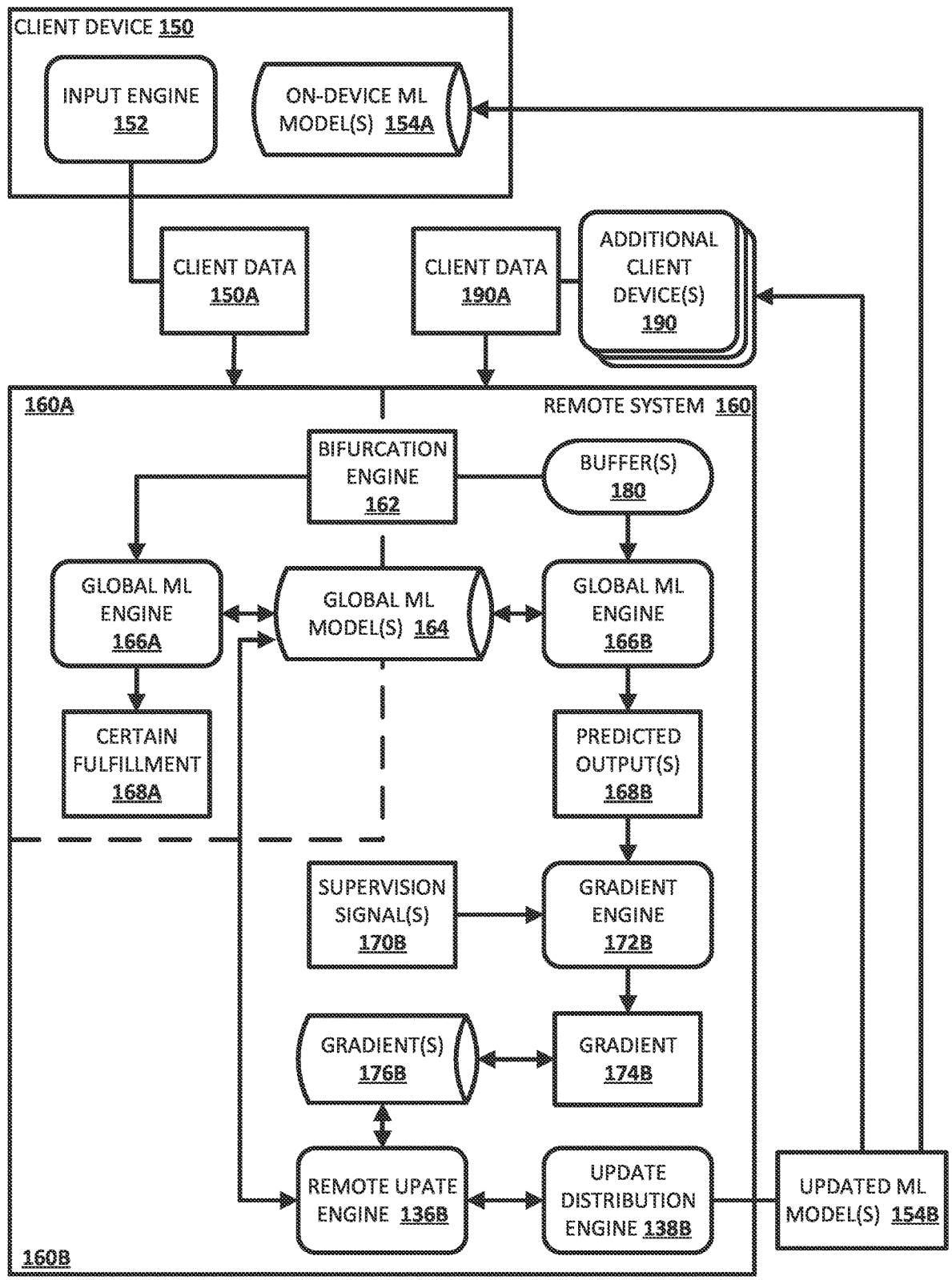
FIG. 1 depicts an example process flows that demonstrate various aspects of the present disclosure, in accordance with various implementations.

FIG. 1 depicts an example process flows that demonstrate various aspects of the present disclosure. A client device 150 is illustrated in FIG. 1, and includes at least the components that are encompassed within the box of FIG. 1 that represents the client device 150. Input engine 152 can detect various types of user input using various components and sensors. For example, the input engine 152 can detect spoken utterances based on audio data generated via one or more microphones of the client device 150, typed input based on textual data generated via a touch-sensitive display of the client device 150 or peripheral device in communication with the client device 150 (e.g., a keyboard integral with the client device 150 or an external keyboard), touch input based on touch data generated via the touch-sensitive display of the client device 150 one or more buttons of the client device 150 (e.g., one or more hardware buttons and/or software buttons), gesture input based on vision data generated via one or more vision components of the client device 150, and/or any other type of user input that can be detected by the client device 150. Further, the client device 150 may include various on-device machine learning (ML) models that can be utilized in processing any user input detected at the client device 150 (e.g., as described in more detail with respect to FIG. 2). These user inputs detected by the input engine 152 can be transmitted from the client device 150 to a remote system 160 over one or more networks (e.g., over one or more local area networks (LANs) and/or wide area networks (WANs)) as client data 150A (e.g., the user inputs detected at the client device 150 and optionally along with other data (e.g., metadata)). Further, user inputs detected at one or more additional client devices 190 can be transmitted from one or more of the additional client devices 190 to the remote system 160 over one or more of the remote systems as client data 190A (e.g., the user inputs detected at one or more of the client devices 190 and optionally along with other data (e.g., metadata)).

As described herein, implementations are directed to ephemeral learning of ML model(s) as a ML technique for training ML model(s). Similar to traditional federated learning, ephemeral learning utilizes gradients generated based on the client data 150A and/or 190A to update ML model(s). However, and in contrast with traditional federated learning where the gradients are generated locally at the client devices 150 and/or 190 respectively, the gradients are generated by the remote system 160. With ephemeral learning, the client data 150A and/or 190A is transmitted to the remote system 160 to leverage one or more capabilities of the remote system 160 in causing certain fulfillment to be performed based on the user inputs detected at the client devices 150 and/or 190, respectively, which enables the remote system 160 to also utilize the client data 150A and/or 190A to update the ML model(s). Notably, the remote system 160 utilizes the client data 150A and/or 190A to generate the gradients without storing or logging the client data 150A and/or 190A in any non-transient memory of the remote system 160. Put another way, the remote system 160 may be needed to cause certain fulfillment of user input received at one of the client devices 150 and/or 190 to be performed. As a result, the client devices 150 and/or 190 transmit the client data 150A and/or 190A to the remote system 160. Ephemeral learning can be utilized at the remote system 160 to update or train ML model(s) based on the client data 150A and/or 190A while it is available at the remote system 160, thereby leveraging the client data 150A and/or 190A to generate more accurate and precise ML model(s) the while also maintaining or increasing security of the client data 150A and/or 190A.

In some implementations, the remote system 160 can utilize a bifurcation engine 162 to duplicate the client data 150A and/or 190A, and utilize a first instance of the client data 150A and/or 190A via a fulfillment pipeline 160A (e.g., generally indicated by the dashed box in the top left portion the remote system 160) and second instance of the client data 150A and/or 190A via a training pipeline 160B (e.g., generally indicated by the remaining portion of the remote system 160). In additional or alternative implementations, the fulfillment pipeline 160A and the training pipeline 160B may include shared memory and both have access to the client data 150A and/or 190A. In these implementations, the bifurcation engine 162 may be omitted. In some implementations, the fulfillment pipeline 160A and the training pipeline 160B may be implemented via the same high-performance server or the same cluster of high-performance servers. In additional or alternative implementations, the fulfillment pipeline 160A may be implemented via a dedicated high-performance server or dedicated cluster of high-performance servers and the training pipeline 160B may be implemented via a distinct, dedicated high-performance server or distinct, dedicated cluster of high-performance servers.

The fulfillment pipeline 160A can process the client data 150A and/or 190A as it is received at the remote system 160 (e.g., as a stream of client data). In particular, the fulfillment pipeline 160A can utilize global ML engine 166A to process the client data 150A and/or 190A using one or more global ML models stored in the global ML model(s) database 164 to cause certain fulfillment 168A to be performed based on the client data 150A and/or 190A. In some implementations, one or more of the global ML models stored in the global ML model(s) database 164 may be received from a third-party developer. As used herein, the term third-party may refer to an entity that is distinct from an entity that hosts the remote system 160. In these implementations, one or more of the third-party global ML models can be utilized by the remote system 160 as part of the fulfillment pipeline 160A when the client data 150A and/or 190A is associated with the third-party. Further, one or more of the third-party global ML models can be utilized by the remote system 160 as part of the training pipeline 160B, such that the training pipeline 160B offers training as a service.

Notably, one or more of the global ML models utilized by the global ML engine 166A to process the client data 150A and/or 190A, and, as a result, the certain fulfillment 168A of the client data 150A and/or 190A may be based on a type of the client data (e.g., audio data capturing spoken utterance(s), typed input, touch input, gesture input, etc.). For example, assume a stream of audio data capturing a spoken utterance of a user of the client device 150, such as "Hey Assistant", is generated via one or more microphones of the client device 150 and detected via the input engine 152. Further assume the audio data is transmitted to the remote system 160 as the client data 150A. In this example, the fulfillment pipeline 160A can cause the global ML engine 166A to process the stream of audio data using various audio-based global ML models stored in the global ML model(s) database. For instance, the global ML engine 166A can process, using a global hotword detection model, the audio data capturing the spoken utterance to generate hotword data that predicts whether the spoken utterance includes a particular word or phrase that invokes an automated assistant (e.g., the phrase "Hey Assistant"). The hotword data can include a predicted value indicative of whether the spoken utterance includes a particular word or phrase that invokes the automated assistant, such as a binary value, probability, or log likelihood. Further, the global ML engine 166A may determine that the spoken utterance includes a particular word or phrase that invokes the automated assistant if the predicted value satisfies a threshold. Accordingly, in this example, the certain fulfillment 168A of the spoken utterance in this example may include activating one or more currently dormant automated assistant functions, such as automatic speech recognition (ASR) and/or other automated assistant functions.

Continuing with the above example, assume the stream of audio data capturing an additional spoken utterance of the user of the client device 150, such as "What's the weather?", is generated via one or more of the microphones of the client device 150 and detected via the input engine 152. Further assume the audio data is transmitted to the remote system 160 as the client data 150A. In this example, the global ML engine 166A can process, using a global ASR model, the audio data capturing the spoken utterance to generate ASR data that predicts one or more of terms of the spoken utterance (e.g., "What's the weather?"). The ASR data can include corresponding predicted values for terms and/or phrases, such as a plurality of term hypotheses and binary values, probabilities, or log likelihoods for each of the term hypotheses. The global ML engine 166A may select the term hypotheses having the highest corresponding predicted values as recognized text for the spoken utterance. Further, in this example, the global ML engine 166A can process, using a global natural language understanding (NLU) model, the recognized text to generate NLU data that predicts one or more intents and one or more slot values for one or more corresponding parameters associated with the one or more intents. In this example, the NLU data can include one or more predicted intents can include a weather intent with an inferred slot value of "today" for "time" parameter and a slot value of "[location]" for a "location" parameter, where the slot value of "[location]" can be inferred as a current location based on metadata transmitted along with the audio data as part of the client data 150A. Moreover, the global ML engine 166A may generate one or more structured requests based on the NLU data, and transmit one or more of the structured requests to a fulfiller capable of providing the weather information requested by the user. Accordingly, the certain fulfillment 168A of the spoken utterance in this example may include causing the weather information to be provided for presentation to the user via the client device 150 as the certain fulfillment 168A. Additionally, or alternatively, the certain fulfillment 168A of the spoken utterance in this example may include the ASR data to be provided for presentation to the user via the client device 150 and/or utilized locally at the client device 150 to obtain the weather information to be provided for presentation to the user. Notably, in this example, the certain fulfillment 168A may not trigger any additional downstream systems or ML models.

Although the above examples are described with respect to using audio-based ML models in causing the certain fulfillment 168A to be performed, it should be understood that is for the sake of example and is not meant to be limiting. For instance, assume a stream of vision data capturing a gesture of a user of the client device 150, such as a gesture that is intended to invoke an automated assistant, is generated via one or more vision components of the client device 150 and detected via the input engine 152. Further assume the vision data is transmitted to the remote system 160 as the client data 150A. In this example, the fulfillment pipeline 160A can cause the global ML engine 166A to process the stream of audio data using various vision-based global ML models stored in the global ML model(s) database. For instance, the global ML engine 166A can process, using a global hotword free invocation model, the vision data capturing the gesture to generate hotword free data that predicts whether the gesture includes a particular gesture that invokes an automated assistant (e.g., a particular hand movement, arm movement, and/or body movement). The hotword free data can include a predicted value indicative of whether the gesture includes a particular gesture that invokes the automated assistant, such as a binary value, probability, or log likelihood. Further, the global ML engine 166A may determine that the gesture includes a particular gesture that invokes the automated assistant if the predicted value satisfies a threshold. Accordingly, in this example, the certain fulfillment 168A of the spoken utterance in this example may also include activating one or more currently dormant automated assistant functions, such as automatic speech recognition (ASR) and/or other automated assistant functions.

In parallel, the training pipeline 160B can process the client data 150A and/or 190A as it is received at the remote system 160. In some implementations, the training pipeline 160B may include one or more buffers 180 to route the client data 150A and/or 190A and/or to process the client data 150A and/or 190A prior to training. For example, one or more of the buffers 180 can be utilized to sort the client data 150A and/or 190A based on a primary language associated with the client devices 150 and/or 190 and/or based on a geographic region associated with the client devices 150 and/or 190. The primary language associated with the client devices 150 and/or 190 and/or the geographic region associated with the client devices 150 and/or 190 may be included as part of the metadata transmitted to the remote system 160 along with the user inputs to form the client data 150A and/or 190A. For instance, a first buffer may be associated with the English language, a second buffer may be associated with the German language, a third buffer may be associated with the French language, and so on. Additionally, or alternatively, a first buffer may be associated the Southeastern region of the United States or a first particular state, a second buffer may be associated with a Northeastern region of the United States or a second particular state, a third buffer may be associated with a West Coast region of the United States or a third particular state, and so on. This enables the training pipeline 160B to train ML models that are specific to particular languages and/or geographic regions. Also, for example, one or more of the buffers 180 can be utilized to pre-process the client data 150A and/or 190A prior to training by re-sampling the client data 150A and/or 190A, segmenting the client data 150A and/or 190A, and/or performing other preprocessing operations on the client data 150A and/or 190A.

Further, the training pipeline 160B can utilize global ML engine 166B (e.g., the global ML engine 166A of the fulfillment pipeline 160A and/or a distinct instance of a global ML engine) to process the client data 150A and/or 190A using one or more global ML models stored in the global ML model(s) database 164 to generate one or more predicted outputs 168B. Similar to the certain fulfillment 168A described above with respect to the fulfillment pipeline 166A, one or more of the global ML models utilized by the global ML engine 166B to process the client data 150A and/or 190A, and, as a result, one or more of the predicted outputs 168B generated based on the client data 150A and/or 190A may be based on a type of the client data (e.g., audio data capturing spoken utterance(s), typed input, touch input, gesture input, etc.). In some implementations, from the above examples described with respect to the global ML engine 166A of the training pipeline 160A, one or more of the predicted outputs 168B may correspond to the hotword data, the ASR data, or the hotword free data, respectively. In some versions of those implementations, the training pipeline 160B may utilize data generated by the fulfillment pipeline 160A as one or more of the predicted outputs 168B to conserve computational resources at the remote system. However, in additional or alternative implementations, the training pipeline 160B may generate one or more of the predicted outputs 168B based on learning techniques utilized to generate one or more gradients for updating one or more of the global ML models.

For example, gradient engine 172B can generate a gradient 174B based on the one or more of the predicted outputs 168B. In some implementations, the gradient engine 172B can generate the gradient 174B based on comparing one or more of the predicted outputs 168B to one or more supervision signals 170B generated using unsupervised learning techniques. Put another way, one or more ground truth outputs for the client data 150A and/or 190A are likely unavailable to the remote system 160. As a result, the remote system 160 may utilize various unsupervised learning techniques to generate one or more of the supervision signals 170B. For example, and as described in more detail with respect to FIGS. 3 and 4, the remote system 160 may utilize semi-supervised learning to generate one or more of the supervision signals 170B (e.g., a teacher-student approach). However, in some implementations, the remote system 160 may receive one or more of the supervision signals 160 based on additional user input detected at the client device 150. For instance, assume the certain fulfillment 168A of the spoken utterance includes ASR data predicted to correspond to a spoken utterance captured in audio data processed by the remote system 160. In this instance, the ASR data can include a transcription that is predicted to correspond to the spoken utterance and additional user input that corrects one or more terms of the transcription can be utilized to generate one or more of the supervision signals based on this implicit feedback. Also, for instance, assume the certain fulfillment 168A of the spoken utterance includes hotword data that includes a prediction of whether the user of the client device 150 intended an automated assistant to be invoked based on audio data processed by the remote system 160. Further assume the remote system 160 determines the user intended the automated assistant to be invoked. In this instance, the user can be prompted to verify whether the user intended the automated assistant to be invoked and additional user input received responsive to the prompt can be utilized to generate one or more of the supervision signals based on this explicit feedback. As another example, and as described in more detail with respect to FIGS. 3 and 5, the remote system 160 may utilize self-supervised learning to generate one or more of the supervision signals 170B.

In some implementations, the gradient 174B (and other gradients) may be derived from a loss function used to train the ML model(s), such that the gradient represents a value of that loss function (or a derivative thereof) obtained from comparison of one or more of the supervision signals 170B to one or more of the predicted outputs 168B. For example, when one or more of the supervision signals 170B to one or more of the predicted outputs 168B match, the gradient engine 172B can generate a zero gradient. Also, for example, one or more of the supervision signals 170B to one or more of the predicted outputs 168B do not match, the gradient engine 172B can generate a non-zero gradient that is optionally dependent on the extent of the mismatching. The extent of the mismatching can be based on an extent of mismatching between deterministic comparisons of one or more of the supervision signals 170B to one or more of the predicted outputs 168B. In additional or alternative implementations, the gradient 174B (and other gradients) may be derived from a loss function used to train one or more of the ML models, such that the gradient represents a value of that loss function (or a derivative thereof) determined based on one or more of the predicted outputs 168B (e.g., without considering any supervision signals). The gradient 174B can be stored in gradient(s) database 176B along with other gradients until remote update engine 136B utilizes the gradients to update one or more of the ML models stored in the global ML model(s) database 164.

The remote update engine 136B can utilize at least the gradient 174B to update one or more weights of the global ML model(s) stored in the global ML model(s) database 164. For example, the remote update engine 136B can identify particular global ML model(s), from among one or more of the global ML models stored in the global ML model(s) database 164, to update weights thereof. In some implementations, the remote update engine 136B can identify the particular global ML model based on the type of gradients that are stored in the gradient(s) database 176B. For example, if a plurality of hotword gradients are stored in the gradient(s) database 176B, the remote training engine 136 can identify one or more global hotword models for updating based on the plurality of hotword gradients. As another example, if a plurality of audio-based gradients are stored in the gradient(s) database 176B, the remote update engine 136B can identify global audio-based model(s) for updating based on the plurality of audio-based gradients. Notably, the remote update engine 136B can identify a single global ML model to be updated at a given time instance or multiple global ML models to be updated, in parallel, at the given time instance.

In some implementations, the remote system 160 can assign the gradient 174B to a specific iteration of updating of one or more of the global ML models based on one or more criteria. The one or more criteria can include, for example, the types of gradients available to the remote update engine 136B, a threshold quantity of gradients available to the remote update engine 136B, a threshold duration of time of updating using the gradients, and/or other criteria. In particular, the remote update engine 136B can identify multiple sets or subsets of gradients generated by the client devices 150 and/or 190. Further, the remote update engine 136B can update one or more of the global ML models based on these sets or subsets of the gradients. In some further versions of those implementations, a quantity of gradients in the sets of client gradients and sets of remote gradients be the same or vary (e.g., proportional to one another and having either more client gradients or more remote gradients). In yet further versions of those implementations, each of the subsets of client gradients can optionally include client gradients from at least one unique client device that is not included in another one of the subsets. In other implementations, the remote system 160 utilize the gradient 174B and other gradients to update one or more of the global ML models in a first in, first out (FIFO) manner without assigning any gradient to a specific iteration of updating of one or more of the global ML models.

Update distribution engine 138B can transmit one or more of the updated global ML models 154B and/or one or more of the updated global weights thereof to the client devices 150 and/or 190. In some implementations, the update distribution engine 138B can transmit one or more of the updated global ML models 154B and/or one or more of the updated global weights thereof to the client devices 150 and/or 190 in response to one or more conditions being satisfied for the client devices 150 and/or 190, and/or the remote system 160 (e.g., as described with respect to FIGS. 3 and 4). Upon receiving one or more of the updated global ML models 154B and/or one or more of the updated global weights thereof, the client devices 150 and/or 190 can replace one or more on-device ML models stored in the on-device ML models database 154A with one or more of the updated global ML models 154B, or replace one or more local weights of one or more of the on-device ML models with one or more of the updated global weights of the updated ML model(s) 154B in the on-device ML model(s) database 154A. Further, the client devices 150 and/or 190 may subsequently use one or more of the updated on-device ML model(s) to make predictions based on further user input detected at the client devices 150 and/or 190 (e.g., as described in greater detail with respect to FIG. 2). The client devices 150 and/or 190 can continue transmitting the client data 150A and/or 190A to the remote system 160 in the manner described herein. Further, the remote system 160 can continue generating gradients to continue updating a corresponding instance of one or more of the global ML models in the manner described herein.

Figure 2:
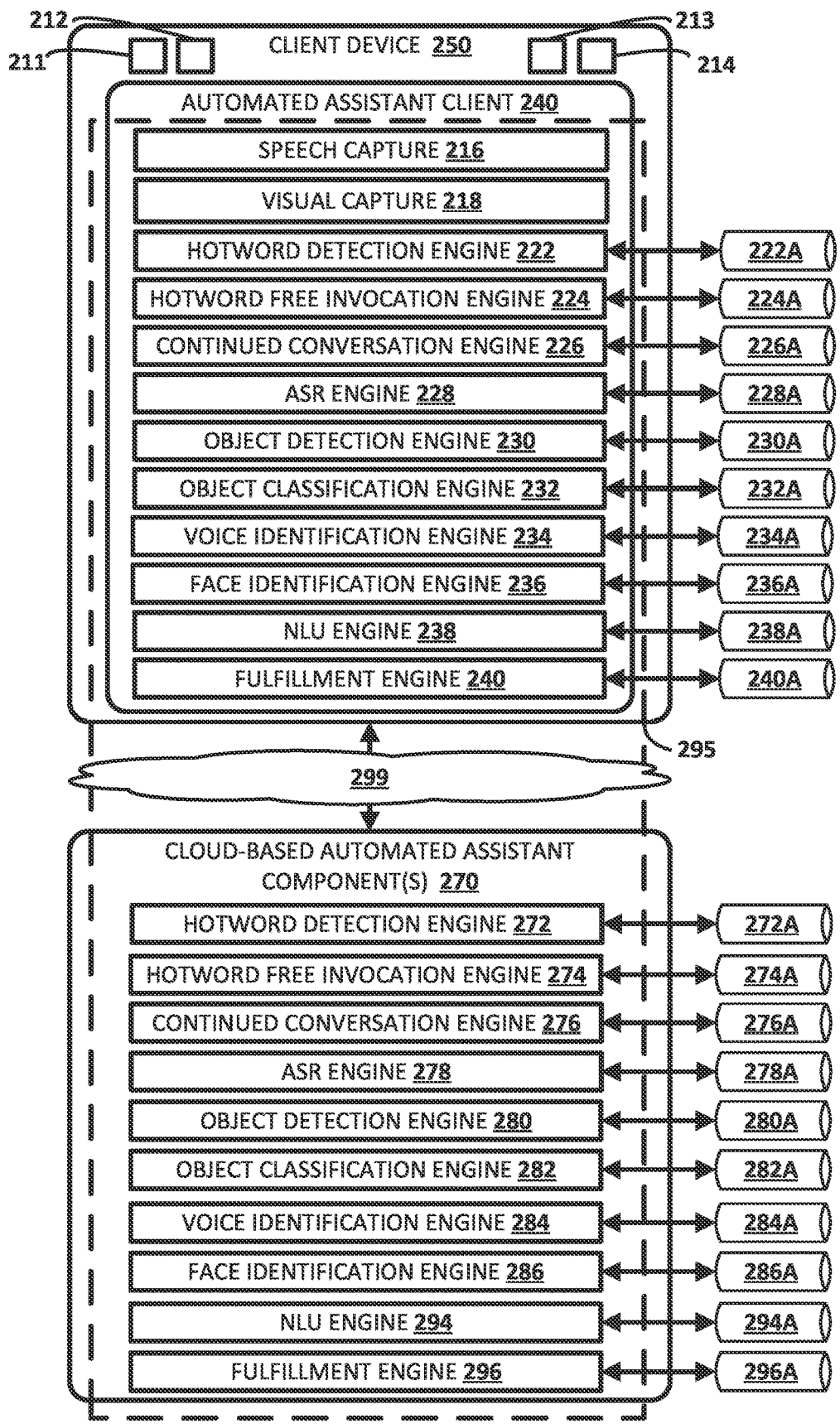
FIG. 2 depicts a block diagram of an example environment in which implementations disclosed herein may be implemented.

Turning now to FIG. 2, a client device 250 is illustrated in an implementation where various on-device ML engines are included as part of (or in communication with) an automated assistant client 240 is depicted. The respective ML models are also illustrated interfacing with the various on-device ML engines. Other components of the client device 250 are not illustrated in FIG. 2 for simplicity. FIG. 2 illustrates one example of how the various on-device ML engines of and their respective ML models can be utilized by the automated assistant client 240 in performing various actions.

The client device 250 in FIG. 2 is illustrated with one or more microphones 211, one or more speakers 212, one or more vision components 213, and display(s) 214 (e.g., a touch-sensitive display). The client device 250 may further include pressure sensor(s), proximity sensor(s), accelerometer(s), magnetometer(s), and/or other sensor(s) that are used to generate other sensor data that is in addition to audio data captured by the one or more microphones 211. The client device 250 at least selectively executes the automated assistant client 240. The automated assistant client 240 includes, in the example of FIG. 2, hotword detection engine 222, hotword free invocation engine 224, continued conversation engine 226, ASR engine 228, object detection engine 230, object classification engine 232, voice identification engine 234, and face identification engine 236. The automated assistant client 240 further includes speech capture engine 216 and visual capture engine 218. It should be understood that the ML engines and ML models depicted in FIG. 2 are provided for the sake of example, and are not meant to be limiting. For example, the automated assistant client 240 can further include additional and/or alternative engines, such as a text-to-speech (TTS) engine and a respective TTS model, a voice activity detection (VAD) engine and a respective VAD model, an endpoint detector engine and a respective endpoint detector model, a lip movement engine and a respective lip movement model, and/or other engine(s) along with associated ML model(s). Moreover, it should be understood that one or more of the engines and/or models described herein can be combined, such that a single engine and/or model can perform the functions of multiple engines and/or models described herein.

One or more cloud-based automated assistant components 270 can optionally be implemented on one or more computing systems (collectively referred to as a "cloud" computing system) that are communicatively coupled to client device 250 via one or more networks as indicated generally by 299. The cloud-based automated assistant components 270 can be implemented, for example, via a cluster of high-performance servers. In various implementations, an instance of the automated assistant client 240, by way of its interactions with one or more of the cloud-based automated assistant components 270, may form what appears to be, from a user's perspective, a logical instance of an automated assistant as indicated generally by 295 with which the user may engage in a human-to-computer interactions (e.g., spoken interactions, gesture-based interactions, and/or touch-based interactions).

The client device 250 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 218, to capture image data corresponding to vision frames (e.g., image frames, laser-based vision frames) of an environment in which the client device 250 is deployed. In some implementations, such vision frame(s) can be utilized to determine whether a user is present near the client device 250 and/or a distance of a given user of the client device 250 (e.g., the user's face) relative to the client device 250. Such determination(s) can be utilized, for example, in determining whether to activate the various on-device ML engines depicted in FIG. 2, and/or other engine(s). Further, the speech capture engine 218 can be configured to capture a user's spoken utterance(s) and/or other audio data captured via the one or more of the microphones 211.

As described herein, such audio data and other non-audio sensor data (also collectively referred to herein as client data) can be processed by the various engines depicted in FIG. 2 to make predictions at the client device 250 using corresponding ML models and/or at one or more of the cloud-based automated assistant components 270 using corresponding ML models updated in the manner described above with respect to FIGS. 1, 3, 4, and 5.

As some non-limiting example, the respective hotword detection engines 222, 272 can utilize respective hotword detection models 222A, 272A to predict whether audio data includes one or more particular words or phrases to invoke the automated assistant 295 (e.g., "Ok Assistant", "Hey Assistant", "What is the weather Assistant?", etc.) or certain functions of the automated assistant 295; the respective hotword free invocation engines 224, 274 can utilize respective hotword free invocation model 224A, 274A to predict whether non-audio sensor data (e.g., image data) includes a gesture or signal to invoke the automated assistant 295 (e.g., based on a gaze of the user and optionally further based on mouth movement of the user); the respective continued conversation engines 226, 276 can utilize a respective continued conversation model 226A, 276A to predict whether further audio data is directed to the automated assistant 295 (e.g., or directed to an additional user in the environment of the client device 250); the respective ASR engines 228, 278 can utilize a respective ASR model 228A, 278A to generate recognized text, or predict phoneme(s) and/or token(s) that correspond to audio data detected at the client device 250 and generate the recognized text based on the phoneme(s) and/or token(s); the respective object detection engines 230, 280 can utilize a respective object detection model 230A, 280A to predict object location(s) included in image data of an image captured at the client device 250; the respective object classification engines 232, 282 can utilize a respective object classification model 232A, 282A to predict object classification(s) of object(s) included in image data of an image captured at the client device 250; the respective voice identification engines 234, 284 can utilize a respective voice identification model 234, 284A to predict whether audio data captures a spoken utterance of one or more users of the client device 250 (e.g., by generating a speaker embedding, or other representation, that can be compared to a corresponding actual embeddings for one or more of the user of the client device 250); and the respective face identification engines 236, 286 can utilize a respective face identification model 236A, 286A to predict whether image data captures one or more of the users in an environment of the client device 250 (e.g., by generating an image embedding, or other representation, that can be compared to a corresponding image embeddings for one or more of the user of the client device 250).

In some implementations, the client device 250 and one or more of the cloud-based automated assistant components 270 may further include natural language understanding (NLU) engines 238, 294 and fulfillment engine 240, 296, respectively. The NLU engines 238, 294 may perform natural language understanding, utilizing respective NLU models 238A, 294-A, on recognized text, predicted phoneme(s), and/or predicted token(s) generated by the ASR engines 228, 278 to generate NLU data. The NLU data can include, for example, intent(s) that correspond to the spoken utterance and optionally slot value(s) for parameter(s) for the intent(s). Further, the client device 250 and one or more of the cloud-based automated assistant components 270 may further include fulfillment engines 240, 296, respectively. The fulfillment engines 240, 296 can generate fulfillment data utilizing respective fulfillment models or rules 240A, 296A, and based on processing the NLU data. This fulfillment data can define certain fulfillment that is responsive to user input (e.g., spoken utterances, typed input, touch input, gesture input, and/or any other type of user input) provided by a user of the client device 250. The certain fulfillment can include interaction(s) to perform with locally installed application(s) based on the user input, command(s) to transmit to Internet-of-things (IoT) device(s) (directly or via corresponding remote system(s)) based on the user input, and/or other resolution action(s) to perform based on the user input. The fulfillment data is then provided for local and/or remote performance/execution of the determined action(s) to cause the certain fulfillment of the user input to be performed. Execution can include, for example, rendering local and/or remote responses (e.g., visually and/or audibly rendering (optionally utilizing an on-device TTS module)), interacting with locally installed applications, transmitting command(s) to IoT device(s), and/or other action(s). In other implementations, the NLU engines 238, 294 and the fulfillment engines 240, 296 may be omitted, and the ASR engines 228, 278 can generate the fulfillment data directly based on the user input. For example, assume the ASR engines 228, 278 processes, using the respective ASR model 228A, 278A, a spoken utterance of "turn on the lights." In this example, the ASR engines 228, 278 can generate a semantic output that is then transmitted to a software application associated with the lights and/or directly to the lights that indicates that they should be turned on.

Notably, the cloud-based automated assistant component(s) 270 include cloud-based counterparts to the engines and models described herein with respect to FIG. 2. However, in some implementations, these engines and models may not be utilized since the engines and models may be transmitted directly to the client device 250 and executed locally at the client device 250, whereas in other implementations, these engines and models may be utilized exclusively when the client device 250 detects any user input and transmits the user input to the cloud-based automated assistant component(s) 270. In various implementations, these engines and models executed at the client device 250 the cloud-based automated assistant component(s) 270 may be utilized in conjunction with one another in a distributed manner. Nonetheless, a remote execution module can optionally be included that performs remote execution based on local or remotely generated NLU data and/or fulfillment data. Additional and/or alternative remote engines can be included. As described herein, in various implementations on-device speech processing, on-device image processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 270 can be utilized at least selectively. For example, such component(s) can be utilized in parallel with on-device component(s) and output from such component(s) utilized when local component(s) fail. For example, if any of the on-device engines and/or models fail (e.g., due to relatively limited resources of client device 250), then the more robust resources of the cloud may be utilized.

Figure 3:
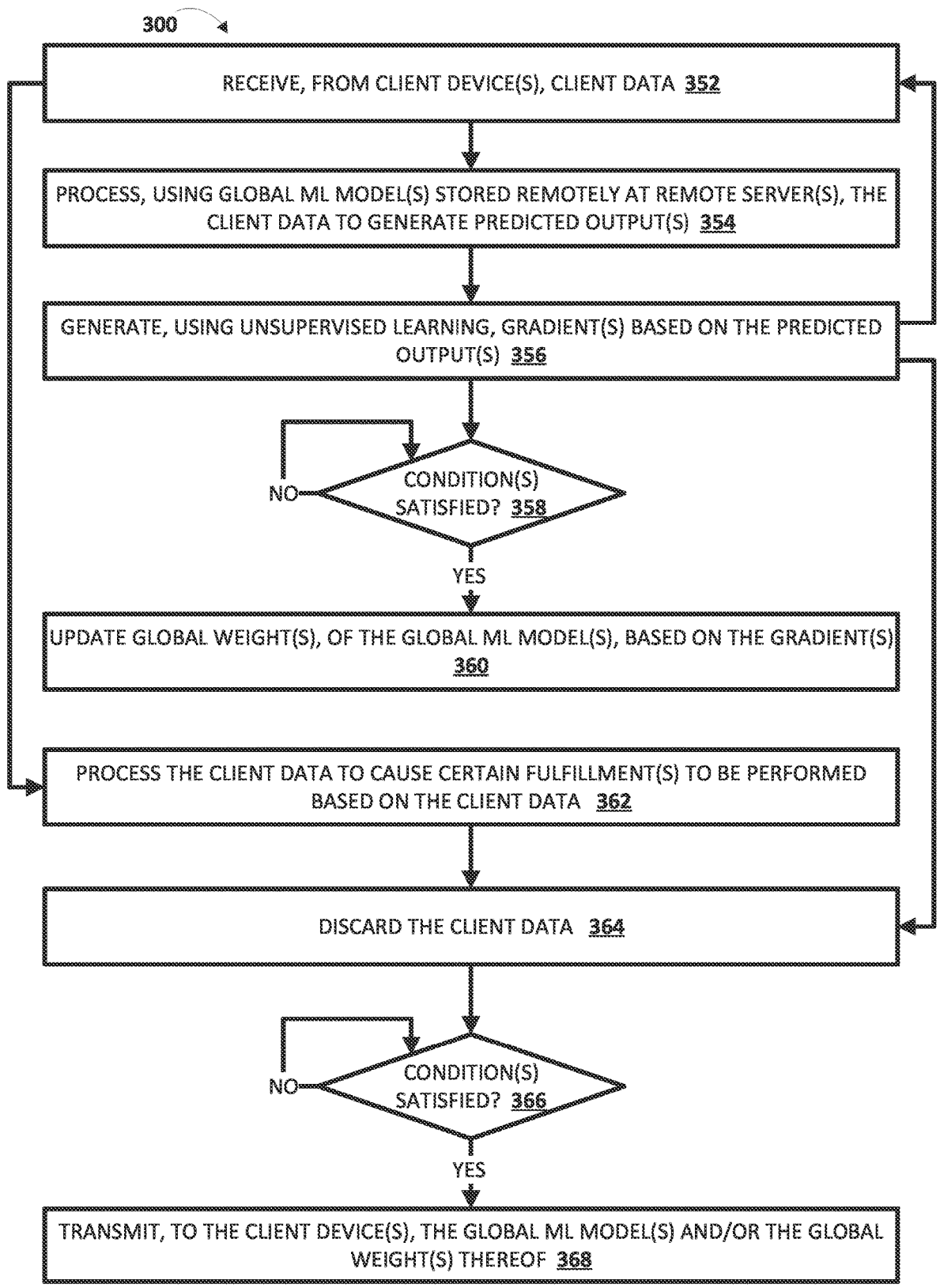
FIG. 3 depicts a flowchart illustrating an example method of ephemeral learning of machine learning model(s), in accordance with various implementations.

Turning now to FIG. 3, a flowchart illustrating an example method 300 of ephemeral learning of machine learning (ML) model(s) is depicted. For convenience, the operations of the method 300 are described with reference to a system that performs the operations. The system of method 300 includes one or more processors and/or other component(s) of a client device (e.g., remote system 160 of FIG. 1, cloud-based automated assistant components 270 of FIG. 2, computing device 610 of FIG. 6, and/or other client devices). Moreover, while operations of the method 300 are shown in a particular order, this is not meant to be limiting. One or more operations may be reordered, omitted, or added.

At block 352, the system receives, from one or more client devices, client data. In some implementations, the client data received from one or more of the client devices corresponds to a corresponding stream of audio data. The corresponding stream of audio data can, for example, capture one or more corresponding spoken utterances generated via one or more respective microphone of one or more of the client devices. In additional or alternative implementations, the client data received from one or more of the client devices corresponds to corresponding non-audio data generated by other corresponding sensors of one or more of the client devices. The non-audio data can, for example, include corresponding textual data generated via a corresponding touch-sensitive display of one or more of the client devices or a corresponding peripheral device (e.g., an external keyboard), corresponding vision data generated via one or more corresponding vision components of one or more of the client devices, corresponding NLU data generated by one or more corresponding on-device NLU models of one or more of the client devices, and/or other types of non-audio data generated via other corresponding sensors of one or more of the client devices. From block 352, the system proceeds, in parallel, to blocks 354-360 to perform operations using the training pipeline described herein and to block 362 to perform operations using the fulfillment pipeline described herein.

At block 354, the system processes, using one or more global ML models stored remotely at one or more remote servers, the client data to generate one or more predicted outputs. The system can generate various types of predicted outputs, and one or more of the predicted outputs generated may be based on the client data and/or one or more of the global ML models utilized to process the client data. For example, in implementations where the client data includes corresponding streams of audio data, one or more of the global ML models can be a global ASR model and one or more of the predicted outputs can be predicted ASR data; one or more of the global ML models can be a global hotword detection model and one or more of the predicted outputs can be hotword detection data; and/or one or more of the global ML models can be a global NLU model and one or more of the predicted outputs can be NLU data generated based on predicted ASR data (e.g., generated at one or more of the remote servers and/or generated at one or more of the client devices based on the corresponding streams of audio data). Also, for example, in implementations where the client data includes corresponding non-audio data, one or more of the global ML models can be a global hotword free invocation model and one or more of the predicted outputs can be predicted hotword free data when the client data corresponds to vision data; one or more of the global ML models can be a global object classification model and one or more of the predicted outputs can be object classification data when the client data corresponds to vision data; and/or one or more of the global ML models can be a global NLU model and one or more of the predicted outputs can be NLU data generated based on predicted ASR data (e.g., generated at one or more of the client devices and transmitted to one or more of the remote servers). Although particular global ML models and particular predicted outputs are described herein, it should be understood that is for the sake of example and is not meant to be limiting. For instance, it should be understood that the ephemeral learning techniques described herein can be utilized to update any global ML models executed by one or more of the remote servers (e.g., such as any of the global ML models described with respect to FIG. 2 and any other global ML models).

In various implementations, and prior to processing the client data to generate one or more of the predicted outputs, the client data may be routed through one or more buffers to ensure that the client data is processed by the appropriate global ML model(s). In some implementations, the one or more buffers can be utilized to tag the client data based on a primary language of a given client device and/or based on a geographical region of the given client device. In these implementations, different instances of the global ML model(s) can be updated based on the different primary languages and/or the geographical regions. For example, if the primary language of the given client device is English, then the client data can be tagged with an "English" tag and processed using global ML model(s) that is specific to the English language. However, if the primary language of the given client device is French, then the client data can be tagged with a "French" tag and processed using global ML model(s) that is specific to the French language. Additionally, or alternatively, if the geographical region of the given client device is the Southeastern United States, then the client data can be tagged with a "Southeastern United States" tag and processed using global ML model(s) that is specific to the Southeastern United States. However, if the geographical region of the given client device is Germany then the client data can be tagged with a "Germany" tag and processed using global ML model(s) that is specific to Germany. In these implementations, the system may determine the different primary languages and/or the geographical regions based on metadata transmitted to the system from one or more of the client devices along with the client data. In some versions of those implementations, the one or more buffers can be utilized to pre-process the client data for purposes of updating the appropriate global ML model(s). For example, the system can utilize one or more of the buffers to re-sample or segment the client data.

At block 356, the system generates, using unsupervised learning, one or more gradients based on one or more of the predicted outputs. The system can utilize various unsupervised learning techniques in generating the gradients. In some implementations, the system can utilize a semi-supervised learning technique for the unsupervised learning (e.g., described with respect to FIGS. 1B and 4). In additional or alternative implementations, the system can utilize a self-supervised learning technique for the unsupervised learning (e.g., described with respect to FIGS. 1C and 5). From block 356, the system proceeds, in parallel, to block 352 to receive additional client data from one or more of the client devices for use in the training pipeline described herein and/or the fulfillment pipeline described herein, to block 358 to determine whether one or more conditions are satisfied for updating one or more global weights of one or more of the global ML models, and to block 364 to discard the client data.

At block 358, the system determines whether one or more conditions for updating one or more global weights of one or more of the global ML models are satisfied. The one or more conditions for updating the one or more of the global weights of one or more of the global ML models can include, for example, a particular time of day, a particular day of week, whether a threshold quantity of gradients are available to update the global weights of the global ML model, or whether performance of the global ML model satisfies a performance threshold. If, at an iteration of block 358, the system determines that the one or more conditions for updating one or more of the global weights of one or more of the global ML models are not satisfied, then the system may continue monitoring for satisfaction of the one or more conditions at block 358. Notably, while the system continues monitoring for satisfaction of the one or more conditions at block 358, the system can continue processing the additional client data using the training pipeline to generate additional gradients as described above (e.g., with respect to blocks 354 and 356) and using the fulfillment pipeline to cause one or more certain fulfillments to be performed as described below (e.g., with respect to block 362). In additional or alternative implementations, block 358 may be omitted and one or more of the global weights of one or more of the global ML models may be updated as one or more of the gradients are generated regardless of whether the one or more conditions are satisfied. If, at an iteration of block 358, the system determines that the one or more conditions for updating one or more of the global weights of one or more of the global ML models are satisfied, then the system may proceed to block 360. Notably, the system can process multiple instances of client data, in parallel, to cause one or more corresponding gradients to be generated in these and other manners.

At block 360, the system updates one or more of the global weights, of one or more of the global ML models, based on one or more of the gradients. In some implementations, the system can utilize a gradient descent algorithm to update one or more of the global weights based on one or more of the gradients. In some versions of those implementations, the system may average one or more of the gradients prior to utilizing the gradient descent algorithm prior to updating one or more of the global weights. In additional or alternative versions of those implementations, the system may utilize each of the one or more gradients, or a subset thereof, to update one or more of the global weights using the gradient descent algorithm. Notably, the system may filter one or more of the gradients, such that one or more of the global weights of one or more of the global ML models are only updated based on one or more gradients generated based on one or more of the predicted outputs generated using those one or more of the ML models. For example, if a given gradient is generated based on one or more predicted outputs generated using a global ASR model, then the given gradient may be utilized in updating the global ASR model, but not a global hotword detection model. Additionally, or alternatively, if a given gradient is generated based on one or more predicted outputs generated using a global hotword model, then the given gradient may be utilized in updating the global hotword model, but not a global ASR model. However, it should be noted in these examples that the given gradient generated based on processing using the global ASR model and the given gradient generated based on processing using the global hotword model may be generated based on the same corresponding stream of audio data, or different corresponding streams of audio data.

As noted above, the system proceeds, in parallel with the operations of the training pipeline of blocks 354-360, to block 362 to perform operations using the fulfillment pipeline. Accordingly, at block 362, the system processes the client data to cause one or more certain fulfillments to be performed based on the client data. For example, in implementations where the client data corresponds to a corresponding stream of audio data, the system can process, using a global hotword detection model, the corresponding stream of audio data to generate hotword data. The hotword data can include a predicted value (e.g., binary value, probability, log likelihood, and/or other predicted value) indicative of whether the corresponding stream of audio data includes one or more particular words or phrases that invokes an automated assistant (e.g., "Hey Assistant", "Assistant", "Stop" when music is playing or an alarm is sounding, "Next" when listening to music or viewing pictures, and/or other particular words or phrases). In this example, and assuming the predicted value indicates the corresponding stream of audio data, the certain fulfillment can correspond activating currently dormant automated assistant functions at a given client device that provided the corresponding stream of audio data and/or one or more of the remote servers (e.g., ASR processing, NLU processing, and/or other automated assistant functions), causing the given client device that provided the corresponding stream of audio data or an additional client device in communication therewith (e.g., a smart television, a smart speaker, and/or any other smart networked appliance) to cause an assistant action to be performed (e.g., cause any music being played to be stopped, cause any alarm sounding to be stopped, cause a next song to be played, cause a next photo to be presented, etc.).

Also, for example, in implementations where the client data corresponds to a corresponding stream of audio data, the system can additionally or alternatively process, using a global ASR model, the corresponding stream of audio data to generate ASR data. Further, the system can process, using a global NLU model, the ASR data to generate NLU data. Moreover, the system can determine the certain fulfillment based on the NLU data. The system can generate one or more structured requests based on the NLU data, transmit one or more of the structured requests to one or more fulfillers to receive response content, and determine the certain fulfillment based on the responsive content. For example, assume a given user of a given client device, of the one or more client devices, provides a spoken utterance of "stream rock music". In this example, a corresponding stream of audio data generated by one or more microphones of the given client device can be transmitted to the system. The system can process, using the global ASR model, the corresponding stream of audio data to generate one or more speech hypotheses that are predicted to correspond to the spoken utterance as the ASR data. Further, the system can process, using the global NLU model, one or more of the speech hypotheses to determine one or more intents (e.g., an intent of "stream music") and one or more corresponding slot values for one or more parameters associated with each of the one or more intents (e.g., a slot value of "rock music" for a "music type" parameter). Based on the one or more intents and/or the one or more corresponding slot values for one or more of the parameters associated with each of the one or more intents, the system can transmit structured requests to various music streaming services to obtain responsive content that identifies a given music streaming service capable of satisfying the spoken utterance. Moreover, the system can cause the given music streaming service to begin streamlining rock music at the given client device (or an additional client device in communication with the client device, such as a smart speaker or smart television) as a certain fulfillment.

Although the above examples are described with respect to implementations where the client data corresponds to corresponding streams of audio data, it should be understood that is for the sake of example and is not meant to be limiting. For example, in implementations where the client data corresponds to corresponding vision data or corresponding textual data, global ML models utilized to process these types of data can be utilized to cause the certain fulfillment to be performed. Notably, the system can process multiple instances of client data, in parallel, to cause corresponding certain fulfillment to be performed in these and other manners.

At block 364, the system discards the client data. In some implementations, the client data may be stored in transient memory shared by one or more remote servers. In some versions of those implementations, the client data may be discarded subsequent to causing the certain fulfillment to be performed regardless of whether the system has finished generating one or more gradients based on processing of the client data to ensure the client data is not logged or stored in non-transient memory of one or more of the remote servers, thereby increasing security of the client data. For example, the training pipeline described herein may be implemented at a first remote server and the fulfillment pipeline described herein may be implemented at a distinct, second remote server. In this example, the training pipeline and the fulfillment pipeline may process the client data in parallel. However, if the fulfillment pipeline causes the certain fulfillment to be performed prior to the training pipeline generating the gradient based on processing the client data, then the client data may be discarded without any gradients being generated based on the client data. In additional or alternative implementations, the client data may be duplicated for use by both the training pipeline described herein and the fulfillment pipeline described herein (and without logging or storing the client data in non-transient memory of one or more of the remote servers) to ensure that the client data is processed by both the training pipeline to generate one or more of the gradients and the fulfillment pipeline to cause the certain fulfillment to be performed.

At block 366, the system determines whether one or more conditions for transmitting one or more of the global ML models and/or one or more of the global weights thereof are satisfied. The one or more conditions can be based on whether one or more of the client devices are ready to receive one or more of the global ML models and/or one or more of the global weights thereof, such as whether one or more of the client devices are charging, that one or more of the client device has at least a threshold state of charge, that a temperature of one or more of the client devices (based on one or more corresponding on-device temperature sensors) is less than a threshold, that one or more of the client device is not being held by a user, temporal condition(s) associated with one or more of the client devices (e.g., between a particular time period, every N hours, where N is a positive integer, and/or other temporal conditions), and/or other conditions. Further, the one or more conditions can additionally, or alternatively, be based on other conditions that are specific to one or more of the remote servers, such as performance of one or more of the global ML models satisfying a performance threshold, one or more of the global ML models being updated based on a threshold quantity of gradients, etc., and/or some combination of these condition(s). If, at an iteration of block 366, the system determines the one or more conditions for transmitting one or more of the global ML models and/or one or more of the global weights thereof are not satisfied, then the system can continuously monitor for whether the one or more conditions are satisfied at block 366. Notably, as the system monitors for satisfaction of the conditions at block 366, the system may continue updating one or more of the global ML models. If, at an iteration of block 366, the system determines the one or more conditions for transmitting one or more of the global ML models and/or one or more of the global weights thereof are satisfied, then the system may proceed to block 368.

At block 368, the system transmits, to one or more of the client devices, one or more of the global ML models and/or one or more of the global weights thereof. The system can transmit one or more of the updated global ML models and/or one or more the global weights thereof to one or more of the client devices, additional client devices beyond those that transmitted the client, or a subset of those client devices that transmitted the client gradients to the remote system. Notably, the one or more conditions may be satisfied at different times for different client devices such that the system may transmit one or more of the global ML models and/or one or more of the global weights thereof in an asynchronous manner. Further, in various implementations, one or more of the global ML models and/or one or more of the global weights thereof can be transmitted to client devices based on a primary language of a given client device and/or a geographic region of the given client device. For example, the global ML models that are updated using the techniques of the method 300 of FIG. 3 can be one of N available ML models for a given language (e.g., where N is a positive integer), but can be updated based on gradients that are specific to the primary language and/or the geographic region, and provided to the client devices configured with the primary language and/or that are primarily located in the geographic region. This enables, for instance, instances of global ASR model(s) to be trained based on client data that is specific to different primary languages and/or different geographic regions.

Figure 4:
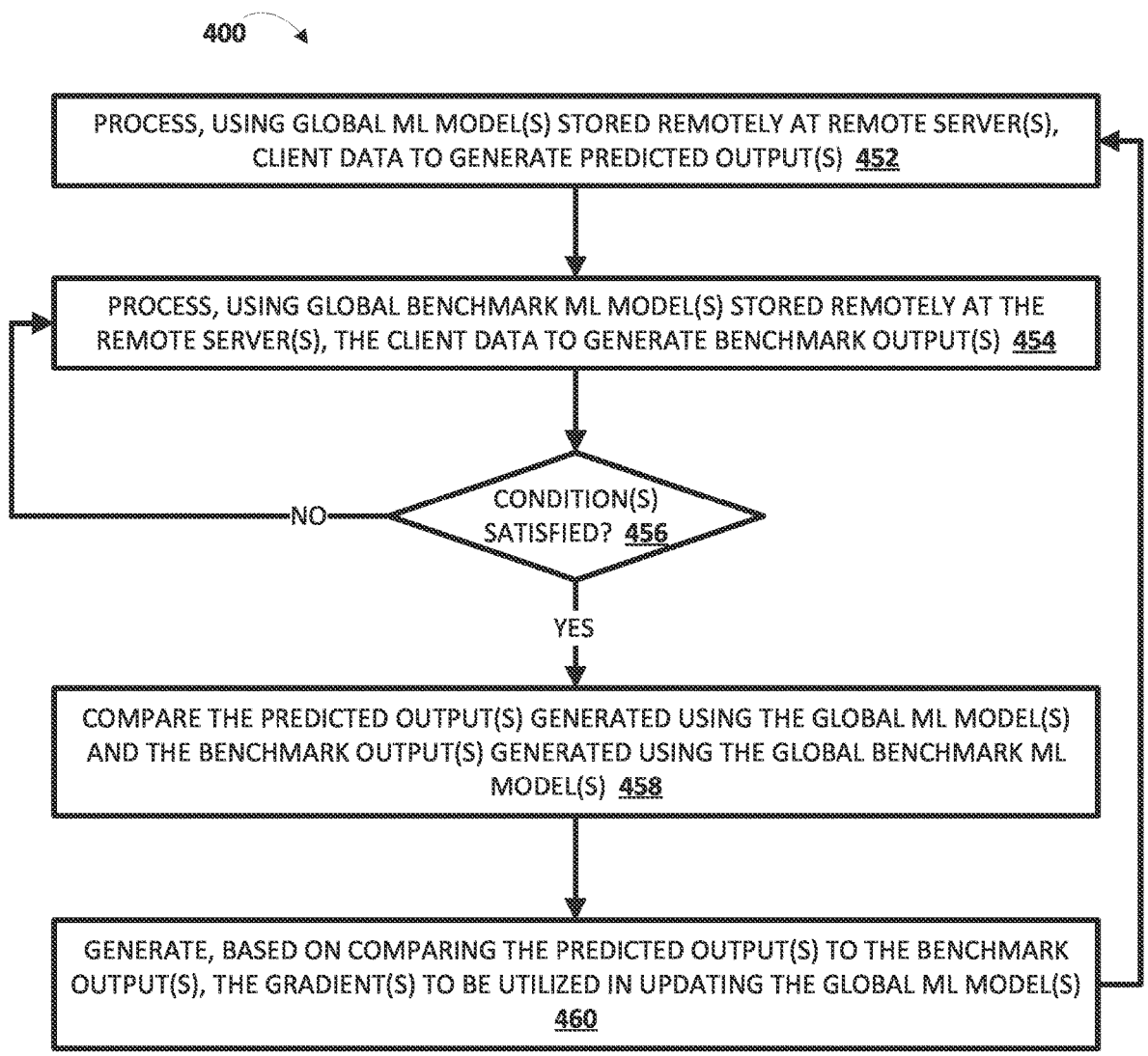
FIG. 4 depicts a flowchart illustrating an example method of using semi-supervised learning in ephemeral learning of machine learning model(s), in accordance with various implementations.

Turning now to FIG. 4, a flowchart illustrating an example method 400 of using semi-supervised learning in ephemeral learning of machine learning (ML) model(s) is depicted. For convenience, the operations of the method 400 are described with reference to a system that performs the operations. The system of method 400 includes one or more processors and/or other component(s) of a client device (e.g., remote system 160 of FIG. 1, cloud-based automated assistant components 270 of FIG. 2, computing device 610 of FIG. 6, and/or other client devices). Moreover, while operations of the method 400 are shown in a particular order, this is not meant to be limiting. One or more operations may be reordered, omitted, or added. Notably, techniques of the method 400 of FIG. 4 may be utilized for unsupervised learning at block 356 of FIG. 3 to generate one or more of the gradients. Further, it should be noted that some operations described with respect to the method 400 of FIG. 4 overlap with operations described with respect to the method 300 of FIG. 3, and that this is for the sake of clarity and is not meant to be limiting.

At block 452, the system processes, using one or more global ML models stored remotely at one or more servers, client data to generate one or more predicted outputs. The system can process, using one or more of the global ML models, the client data to generate one or more of the predicted outputs in the same or similar manner described with respect to block 354 of FIG. 3. At block 454, the system processes, using one or more global benchmark ML models stored remotely at one or more of the remote servers, the client data to generate one or more benchmark outputs. The system can process, using one or more of the global benchmark ML models, the client data to generate one or more of the benchmark outputs in the same or similar manner described with respect to block 354 of FIG. 3. However, it should be noted that the system utilizes one or more of the global benchmark ML models to generate one or more of the benchmark outputs, whereas the system utilizes one or more of the global ML models to generate one or more of the predicted outputs. In various implementations, the global benchmark ML models and the global ML models may form what is generally referred to as a teacher-student network. In these implementations, the teacher network (e.g., one or more of the global benchmark ML models) may be utilized to generate a supervision signal that is utilized in generated gradients for updating the student network (e.g., one or more of the global ML models). In some implementations, one or more of the global benchmark ML models utilized to generate one or more of the benchmark outputs can be the same as one or more of the global ML models to be updated according to the method 400 of FIG. 4. In additional or alternative implementations, one or more of the global benchmark ML models utilized to generate one or more of the benchmark outputs can be distinct from one or more of the global ML models to be updated according to the method 400 of FIG. 4.

At block 456, the system determines whether one or more conditions are satisfied for using the client data in generating one or more gradients. The one or more conditions can include, for example, whether one or more of the predicted outputs satisfy a predicted output threshold, one or more of the benchmark outputs satisfy a benchmark output threshold, and/or other conditions. If, at an iteration of block 456, the system determines the one or more conditions are not satisfied for using the client data in generating one or more gradients, then the system returns to block 452 and proceeds with another iteration of the method 400 of FIG. 4. If, at an iteration of block 456, the system determines the one or more conditions are satisfied for using the client data in generating one or more gradients, then the system proceeds to block 458. For example, assume the client data corresponds to a corresponding stream of audio data generated by a client device, and assume that a given global ML model to be updated is a global ASR model. In this example, the corresponding stream of audio data can be processed, using the global ASR model, to generate ASR data as one or more of the predicted outputs. Further, the corresponding stream of audio data can be processed, using a global benchmark ASR model, to generate benchmark ASR data as one or more of the benchmark outputs. In this example, further assume the ASR data and the benchmark data correspond to term hypotheses that include a predicted term for each word or phrase captured in the corresponding stream of audio data and a corresponding predicted value for each of the predicted terms. In this example, the one or more conditions may be satisfied if one or more of the corresponding predicted values associated with one or more of the predicted terms generated using the global benchmark ASR model satisfy the benchmark output threshold and/or one or more of the corresponding predicted values associated with one or more of the predicted terms generated using the global ASR model satisfy the predicted output threshold.

At block 458, the system compares one or more of the predicted outputs generated using one or more of the global ML models and one or more of the benchmark outputs generated using one or more of the global benchmark ML models. At block 460, the system generates, based on comparing one or more of the predicted outputs to one or more of the benchmark outputs, one or more gradients to be utilized in updating one or more of the global ML models. Notably, in generating the gradient using the semi-supervised learning technique of the method 400 of FIG. 4, the system can generate the gradient directly based on one or more of the predicted outputs. The system can generate the gradient directly based on one or more of the predicted outputs in that one or more of the predicted outputs (e.g., that may be utilized by the fulfillment pipeline) are compared directly to one or more of the benchmark outputs. Continuing with the above example, the system can compare one or more of the corresponding predicted values associated with one or more of the predicted terms generated using the global benchmark ASR model with one or more of the corresponding predicted values associated with one or more of the predicted terms generated using the global ASR model Further, the system can generate the gradient based on comparing the predicted terms and/or the corresponding predicted values. The system may return to block 452 and proceed with another iteration of the method 400 of FIG. 4.

Although the operations of block 456 are depicted as occurring subsequent to the operations of block 454 and prior to the operations of block 458, it should be understood that is for the sake of example and is not meant to be limiting and that one or more additional iterations of the operations of block 454 may be performed elsewhere throughout the method 400 or omitted altogether. For instance, in some implementations, the system may generate one or more of the gradients prior to determining whether the one or more conditions are satisfied. In these implementations, the system may discard one or more of the gradients such that one or more of the gradients may not be utilized in updating one or more of the global weights of one or more of the global ML models. Moreover, although the method 400 of FIG. 4 is described with respect to the client data corresponding to a corresponding stream of audio data, it should be understood that is also for the sake of example and is not meant to be limiting. Rather, it should be understood that the techniques described with respect to the method 400 of FIG. 4 can be utilized to generate one or more gradients using any of the global ML models described herein.

Figure 5:
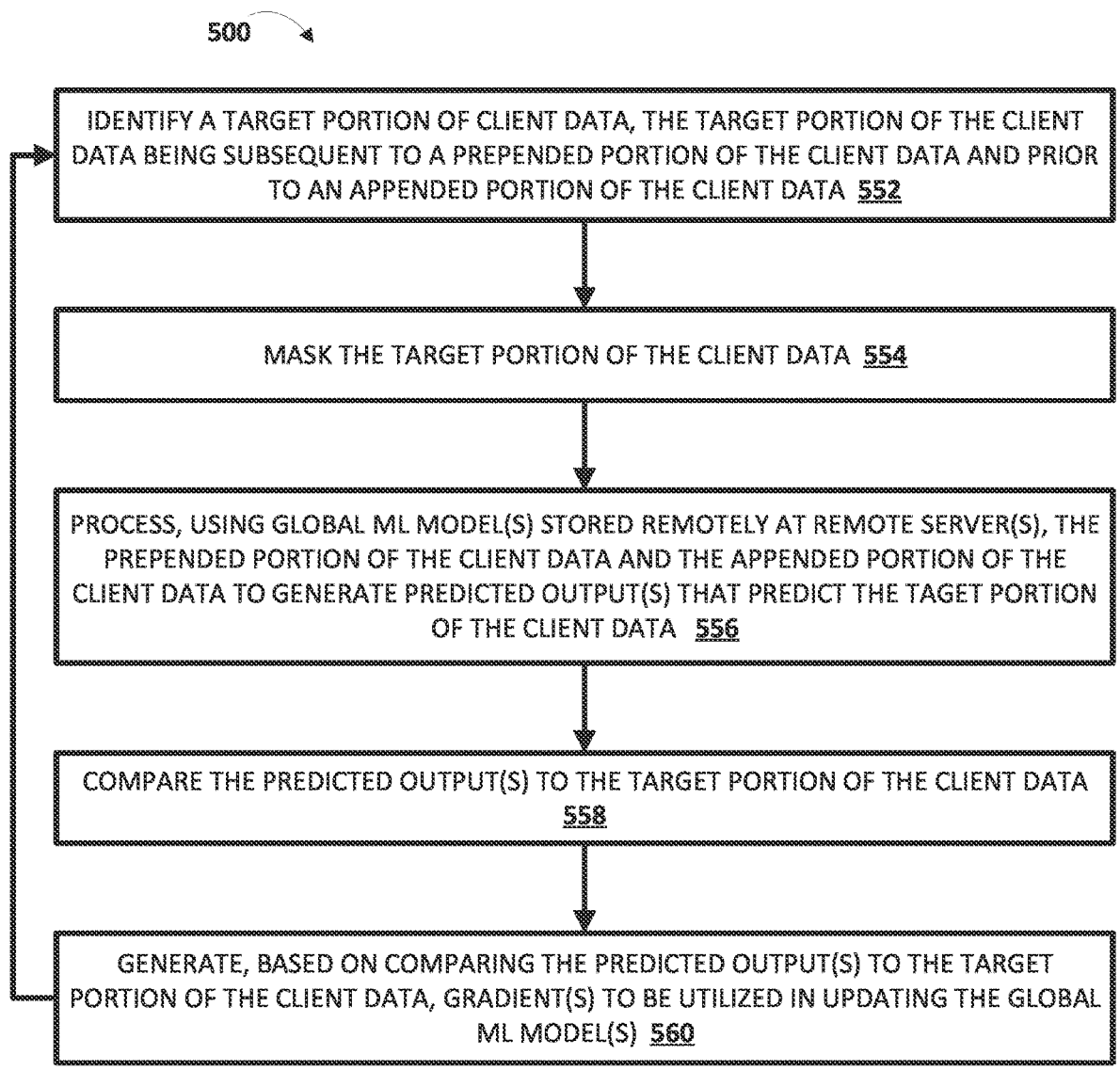
FIG. 5 depicts a flowchart illustrating various example methods of using self-supervised learning in ephemeral learning of machine learning model(s), in accordance with various implementations.

Turning now to FIG. 5, a flowchart illustrating an example method 500 of using self-supervised learning in ephemeral learning of machine learning (ML) model(s) is depicted. For convenience, the operations of the method 500 are described with reference to a system that performs the operations. The system of method 500 includes one or more processors and/or other component(s) of a client device (e.g., remote system 160 of FIG. 1, cloud-based automated assistant components 270 of FIG. 2, computing device 610 of FIG. 6, and/or other client devices). Moreover, while operations of the method 500 are shown in a particular order, this is not meant to be limiting. One or more operations may be reordered, omitted, or added. Notably, techniques of the method 500 of FIG. 5 may be utilized for unsupervised learning at block 356 of FIG. 3 to generate one or more of the gradients. Further, it should be noted that some operations described with respect to the method 500 of FIG. 5 overlap with operations described with respect to the method 300 of FIG. 3, and that this is for the sake of clarity and is not meant to be limiting.

At block 552, the system identifies a target portion of client data, the target portion of the client data being subsequent to a prepended portion of the client data and prior to an appended portion of the client data. At block 554, the system masks the target portion of the client data. The target portion of the client data may be selected arbitrarily, or selected based on one or more criteria such as a particular segment between n and m seconds of audio data corresponds to the target portion, a portion of vision data corresponding to a center portion of an image corresponds to the target portion, a center portion of textual data corresponds to the target portion, and/or any other criteria for selecting the target portion of the client data. In some implementations, the client data may correspond to a corresponding stream of audio data. In these implementations, the target portion of the client data may correspond to a target audio waveform portion of the corresponding stream of audio data, the prepended portion of the client data may correspond to a prepended audio waveform portion that is received prior to the target audio waveform portion, and the appended portion of the client data may correspond to an appended audio waveform portion that is received subsequent to the target audio waveform portion. Further, the system can mask the target audio waveform portion using various masking techniques. In additional or alternative versions of those implementations, the client data may correspond to a representation of the corresponding stream of audio data (e.g., received from one or more of the client devices as the client data and/or generate at one or more of the remote servers), such as a vector representation of the corresponding stream of audio data, ASR data generated based on processing the corresponding stream of audio data, and/or other representations of the audio data. In these implementations, the target portion of the client data may correspond to a target representation portion of the corresponding stream of audio data, the prepended portion of the client data may correspond to a prepended representation portion that precedes the target representation portion, and the appended portion of the client data may correspond to an appended representation portion that follows subsequent to the target representation portion. Further, the system can mask the target representation portion using various masking techniques. In additional or alternative versions of those implementations, the client data may correspond to textual data or vision data. In these implementations, the system can identify the target portion, the prepended portion, and the appended portion in the same or similar manner, and the system can mask the target portion using various masking techniques.

At block 556, the system processes, using one or more global ML models stored remotely at one or more of the remote servers, the prepended portion of the client data and the appended portion of the client data to generate one or more predicted outputs that predict the target portion of the client data. For example, in implementations where the target portion of the client data corresponds to the target audio waveform portion of the corresponding stream of audio data, further assume the audio data captures a spoken utterance. In this example, the system can process, using a global ASR model, the prepended audio waveform portion and the appended audio waveform portion to generate one or more predicted outputs. In this example, one or more of the predicted outputs may correspond to a predicted target audio waveform and/or one or more predicted features of the predicted target audio waveform (e.g., a predicted amplitude, a predicted wavelength, a predicted phase, a predicted period, and/or other features) that are predicted to correspond to the target audio waveform portion. Additionally, or alternatively, one or more of the predicted outputs may more generally correspond to predicted target audio data and/or one or more predicted features of the predicted audio data (e.g., predicted MFCCs, predicted melbank features, and/or other features) that are predicted to correspond to the target audio data. Put another way, the system may attempt to reconstruct the target audio waveform portion based on processing the prepended audio waveform portion and the appended audio waveform portion.

Notably, in implementations where the global ASR model is utilized to reconstruct the target audio waveform portion, the global ASR model may be a multilingual ASR model since a primary language of a given client device that provided the corresponding stream of audio data may be irrelevant to reconstructing the target audio waveform portion. However, in various implementations, the system may additionally, or alternatively, process the prepended audio waveform portion and the appended audio waveform portion using one or more global ASR models that are specific to the primary language of the given client device that provided the corresponding stream of audio data. Also, for example, in implementations where the target portion of the client data corresponds to the target representation portion of the corresponding stream of audio data, further assume the audio data captures a spoken utterance. In this example, the system can process, using a global ASR model and/or a global NLU model, the prepended representation portion and the appended representation portion to generate one or more predicted outputs. In this example, one or more of the predicted outputs may correspond to a predicted target representation that is predicted to correspond to the target representation portion. Put another way, the system may attempt to reconstruct the target representation portion based on processing the prepended representation portion and the appended representation portion.

At block 558, the system compares one or more of the predicted outputs to the target portion of the client data. At block 560, the system generates, based on comparing one or more of the predicted outputs to the target portion of the client data, one or more gradients to be utilized in updating one or more of the global ML models. Notably, in generating the gradient using the self-supervised learning technique of the method 500 of FIG. 5, the system can generate the gradient indirectly based on one or more of the predicted outputs. The system can generate the gradient indirectly based on one or more of the predicted outputs in that features of one or more of the predicted outputs (e.g., rather than the one or more predicted outputs that may be utilized by the fulfillment pipeline) are compared to features of the target portion of the client data without directly comparing one or more of the predicted outputs to anything. Put another way, the system may utilize the actual target portion of the client data that was masked at block 554 as a supervision signal with which one or more of the predicted outputs that are predicted to correspond to the target portion may be compared at block 558. Further, based on the comparison, the system may generate one or more of the gradients. The system returns to block 552 and proceeds with another iteration of the method 500 of FIG. 5.

Although the method 500 of FIG. 5 is primarily described with respect to the client data corresponding to a corresponding stream of audio data, it should be understood that is for the sake of example and is not meant to be limiting. Rather, it should be understood that the techniques described with respect to the method 500 of FIG. 5 can be utilized to generate one or more gradients using any of the global ML models described herein.

Figure 6:
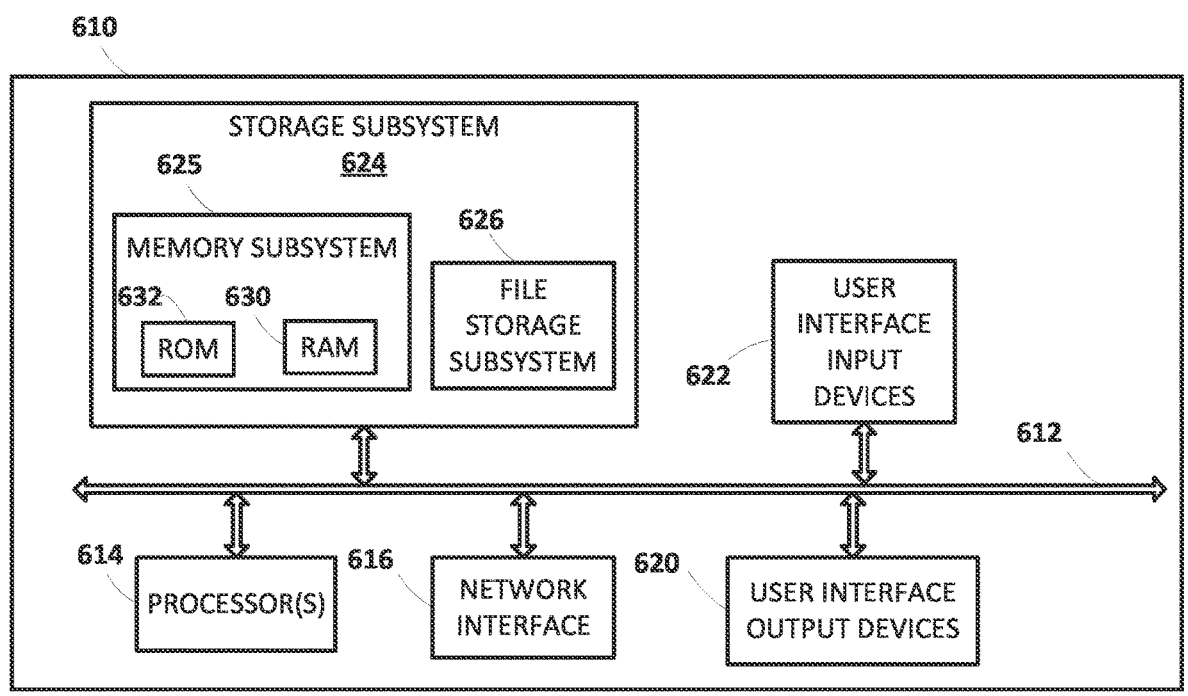
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a client device is provided and includes receiving, from a client device of a user, a stream of audio data capturing a spoken utterance of the user, the stream of audio data being generated by one or more microphones of the client device; processing the stream of audio data to cause a certain fulfillment of the spoken utterance to be performed; while the stream of audio data is being processed to cause the certain fulfillment of the spoken utterance to be performed: processing, using a global machine learning (ML) model stored remotely at one or more of the remote servers, the stream of audio data to generate predicted output; generating, using unsupervised learning, a gradient based on the predicted output; and discarding the stream of audio data; and subsequent to generating the gradient based on the predicted output and using unsupervised learning: updating, based on the gradient, global weights of the global ML model stored remotely at one or more of the remote servers.

These and other implementations of the technology can include one or more of the following features.

In some implementations, processing the stream of audio data to cause the certain fulfillment of the spoken utterance to be performed may include processing, using an automatic speech recognition (ASR) model, the stream of audio data to generate a stream of SR data; processing, using a natural language understanding (NLU) model, the stream of ASR data to generate a stream of NLU data; and causing the certain fulfillment of the spoken utterance to be performed based on the stream of NLU data.

In some implementations, the method may further include, prior to processing the stream of audio data to generate the predicted output using the global ML model, determining whether the stream of audio data satisfies one or more conditions. In these implementations, processing the stream of audio data to generate the predicted output using the global ML model may be in response to determining that the stream of audio data satisfies the one or more conditions, or updating the global weights of the global ML model based on the gradient may be in response to determining that the stream of audio data satisfies the one or more conditions. In some versions of those implementations, determining whether the stream of audio data satisfies the one or more conditions may include processing, using a global benchmark ML model stored remotely at the remote server, the stream of audio data to generate benchmark output and one or more benchmark values associated with the benchmark output; and determining, based on the one or more benchmark values associated with the benchmark output, whether the stream of audio data satisfies the one or more conditions. In some versions of those implementations, generating the gradient based on the predicted output using unsupervised learning may include comparing the predicted output generated using the global ML model to the benchmark output generated using the global benchmark ML model; and generating the gradient based on comparing the predicted output to the benchmark output. In some versions of those implementations, the method may further include, in response to determining that the stream of audio data fails to satisfy the one or more conditions: discarding the stream of audio data without processing the stream of audio data to generate the predicted output.

In some implementations, generating the gradient based on the predicted output using unsupervised learning may include identifying a target portion of the stream of audio data, the target portion of the stream of audio data being subsequent to a prepended portion of the stream of audio data that is received prior to the target portion, and the target portion of the stream of audio data being prior to an appended portion of the stream of audio data that is received subsequent to the target portion; and masking the target portion of the stream of audio data. Processing the stream of audio data using the global ML model to generate the predicted output may include processing the prepended portion of the stream of audio data and the appended portion of the stream of audio data to generate one or more of: a predicted target portion of the stream of audio data that is predicted to correspond to the target portion of the stream of audio data as the predicted output, or one or more predicted features of the predicted target portion of the stream of audio data that is predicted to correspond to the target portion of the stream of audio data as the predicted output. In some versions of those implementations, generating the gradient based on the predicted output using unsupervised learning may include comparing the predicted target portion of the stream of audio data to the target portion of the stream of audio data; and generating the gradient based on comparing the predicted target portion to the target portion. In some versions of those implementations, the target portion of the stream of audio data may correspond to a target audio waveform portion of the stream of audio data, the prepended portion of the stream of audio data that is received prior to the target portion may correspond to a prepended audio waveform portion of the stream of audio data that is received prior to the target audio waveform portion, and the appended portion of the stream of audio data that is received subsequent to the target portion may correspond to an appended audio waveform portion of the stream of audio data that is received subsequent to the target audio waveform portion. In additional or alternative versions of those implementations, the target portion of the stream of audio data may correspond to a target vector representation portion of the stream of audio data, the prepended portion of the stream of audio data that is received prior to the target portion may correspond to a prepended vector representation portion of the stream of audio data that precedes the target vector representation portion, and the appended portion of the stream of audio data that is received subsequent to the target portion may correspond to an appended vector representation portion of the stream of audio data that follows subsequent to the target vector representation portion.

In some implementations, the method may further include, in response to receiving the stream of audio data capturing the spoken utterance of the user and prior to processing the stream of audio data to generate the predicted output using the global ML model: selecting one or more audio buffers to transiently store the stream of audio data. Selecting the one or more audio buffers to transiently store the stream of audio data may be based on data received along with the stream of audio data that identifies a primary language associated with the client device or a geographical region associated with the client device. In some versions of those implementations, the global ML model utilized to generate the predicted output may be specific to one or more of the primary language associated with the client device or the geographical region associated with the client device.

In some implementations, subsequent to updating the weights of the global ML model stored remotely at one or more of the remote servers, the method may further include transmitting, to at least the client device, the global weights of the global ML model. Transmitting the global weights of the global ML model to the client device may cause the client device to replace local weights of an on-device ML model stored locally at the client device with the global weights. In some versions of those implementations, transmitting the global weights of the global ML model to the client device may be in response to determining that one or more conditions are satisfied at the client device. In some further versions of those implementations, the one or more conditions may include one or more of: that the client device is charging, that the client device has at least a threshold state of charge, that hat a temperature of the client device is less than a threshold, that the client device is not being held by the user, a particular time of day, a particular day of week, whether the global weights of the global ML model have been updated based on a threshold quantity of gradients, or whether performance of the global ML model satisfies a performance threshold.

In some implementations, updating the global weights of the global ML model stored remotely at one or more of the remote servers may be in response to determining that one or more conditions are satisfied at one or more of the remote servers. In some versions of those implementations, the one or more conditions may include one or more of: a particular time of day, a particular day of week, whether a threshold quantity of gradients are available to update the global weights of the global ML model, or whether performance of the global ML model satisfies a performance threshold.

In some implementations, the spoken utterance may be directed to a first-party system implemented at least in part at the client device and at least in part at the remote system.

In some implementations, the spoken utterance may be directed to a third-party system implemented at least in part at the client device and at least in part a remote third-party system.

In some implementations, a method performed by one or more processors of a client device is provided and includes receiving, from a plurality of client devices, a plurality of corresponding streams of audio data, each of the plurality of corresponding streams of audio data being generated by one or more corresponding microphones of a respective one of the plurality of client devices; for each of the plurality of corresponding streams of audio data: utilizing a fulfillment pipeline to process a given one of the corresponding streams of audio data to cause corresponding certain fulfillment to be performed; and utilizing a training pipeline to process the given one of the corresponding streams of audio data to cause a global machine learning (ML) model stored remotely at one or more of the remote servers to be updated. Utilizing the training pipeline to process the given one of the corresponding streams of audio data to cause the global ML to be updated includes processing, using the global ML model, the given one of the corresponding streams of audio data to generate predicted output; generating, using unsupervised learning, a gradient based on the predicted output; and discarding the stream of audio data. The method further includes subsequent to generating the gradient based on the predicted output and using unsupervised learning: updating, based on the gradient, global weights of the global ML model stored remotely at one or more of the remote servers.

These and other implementations of the technology can include one or more of the following features.

In some implementations, utilizing the training pipeline to process the given one of the corresponding streams of audio data to cause the global ML model stored remotely at one or more of the remote servers to be updated may occur prior to causing the corresponding certain fulfillment to be performed.

In some implementations, the method may further include subsequent to causing the corresponding certain fulfillment to be performed, discarding the stream of audio data without performing any further processing by the training pipeline and regardless of whether the gradient has been generated.

In some implementations, a method performed by one or more processors of a client device is provided and includes receiving, from a client device of a third-party (3P) developer, a 3P automatic speech recognition (ASR) model; receiving, from a client device of a user, a stream of audio data capturing a spoken utterance of the user, the stream of audio data being generated by one or more microphones of the client device; processing the stream of audio data to cause a certain fulfillment of the spoken utterance to be performed. Processing the stream of audio data to cause the certain fulfillment of the spoken utterance to be performed includes processing, using the 3P ASR model, the stream of audio data to generate a stream of ASR data; processing, using a natural language understanding (NLU) model, the stream of ASR data to generate a stream of NLU data; and causing the certain fulfillment of the spoken utterance to be performed based on the stream of NLU data. The method further includes, while the stream of audio data is being processed to cause the certain fulfillment of the spoken utterance to be performed: generating, using unsupervised learning, a gradient based on the stream of ASR data; and discarding the stream of audio data. The method further includes, subsequent to generating the gradient based on the stream of ASR data and using unsupervised learning: updating, based on the gradient, 3P weights of the 3P ASR model that is received from the 3P developer to generate an updated 3P ASR model; and transmitting, to the client device of the 3P developer, the updated 3P ASR model.

These and other implementations of the technology can include one or more of the following features.

In some implementations, transmitting the updated 3P ASR model to the client device of the 3P developer may be in response to determining that one or more conditions are satisfied at the one or more remote servers. The one or more conditions may include one or more of: a particular time of day, a particular day of week, whether a threshold quantity of gradients have been utilized to update the 3P weights of the 3P ASR model, or whether performance of the 3P ASR model satisfies a performance threshold.

In some implementations, a method performed by one or more processors of a client device is provided and includes receiving, from a client device of a user, a stream of client data capturing a spoken utterance of the user, the stream of client data being generated by one or more sensors of the client device; processing the stream of client data to cause a certain fulfillment of the client data to be performed; while the stream of client data is being processed to cause the certain fulfillment to be performed: processing, using a global machine learning (ML) model stored remotely at one or more of the remote servers, the stream of client data to generate predicted output; generating, using unsupervised learning, a gradient based on the predicted output; and discarding the stream of client data; and subsequent to generating the gradient based on the predicted output and using unsupervised learning: updating, based on the gradient, global weights of the global ML model stored remotely at one or more of the remote servers.

These and other implementations of the technology can include one or more of the following features.

In some implementations, the stream of client data may include one or more of: a stream of audio data generated by one or more microphones of the client device, a stream of vision data generated by one or more vision sensors of the client device, or a stream of textual data generated via one or more user input devices of the client device.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

What is claimed is:

1. A method implemented by one or more processors at one or more remote servers, the method comprising:
   receiving, from a client device of a user, a stream of audio data capturing a spoken utterance of the user, the stream of audio data being generated by one or more microphones of the client device;
   duplicating the stream of audio data to generate a first instance of the stream of audio data and a second instance of the stream of audio data;
   processing the first instance of the stream of audio data to cause a certain fulfillment of the spoken utterance to be performed;
   while the first instance of the stream of audio data is being processed to cause the certain fulfillment of the spoken utterance to be performed:
     processing, using a global machine learning (ML) model stored remotely at one or more of the remote servers, the second instance of the stream of audio data to generate predicted output; and
     generating, using unsupervised learning, a gradient based on the predicted output;
   subsequent to causing the certain fulfillment of the spoken utterance to be performed:
     discarding the first instance of the stream of audio data; and
   subsequent to generating the gradient based on the predicted output and using unsupervised learning:
     discarding the second instance of the stream of audio data; and
     updating, based on the gradient, global weights of the global ML model stored remotely at one or more of the remote servers.

2. The method of claim 1, wherein processing the first instance of the stream of audio data to cause the certain fulfillment of the spoken utterance to be performed comprises:
   processing, using an automatic speech recognition (ASR) model, the first instance of the stream of audio data to generate a stream of ASR data;
   processing, using a natural language understanding (NLU) model, the stream of ASR data to generate a stream of NLU data; and
   causing the certain fulfillment of the spoken utterance to be performed based on the stream of NLU data.

3. The method of claim 1, further comprising:
   prior to processing the second instance of the stream of audio data to generate the predicted output using the global ML model:
     determining that the second instance of the stream of audio data satisfies one or more conditions; and
     wherein processing the second instance of the stream of audio data to generate the predicted output using the global ML model is in response to determining that the second instance of the stream of audio data satisfies the one or more conditions, or
     wherein updating the global weights of the global ML model based on the gradient is in response to determining that the second instance of the stream of audio data satisfies the one or more conditions.

4. The method of claim 3, wherein determining that the second instance of the stream of audio data satisfies the one or more conditions comprises:
   processing, using a global benchmark ML model stored remotely at the remote server, the second instance of the stream of audio data to generate benchmark output and one or more benchmark values associated with the benchmark output; and
   determining, based on the one or more benchmark values associated with the benchmark output satisfying a benchmark output threshold, that the second instance of the stream of audio data satisfies the one or more conditions.

5. The method of claim 3, wherein generating the gradient is directly based on the predicted output using unsupervised learning, and wherein generating the gradient directly based on the predicted output using unsupervised learning comprises:
   comparing the predicted output generated using the global ML model to the benchmark output generated using the global benchmark ML model; and
   generating the gradient based on comparing the predicted output to the benchmark output.

6. The method of claim 1, wherein generating the gradient is indirectly based on the predicted output using unsupervised learning, and wherein generating the gradient indirectly based on the predicted output using unsupervised learning comprises:
identifying a target portion of the second instance of the stream of audio data, the target portion of the second instance of the stream of audio data being subsequent to a prepended portion of the second instance of the stream of audio data that is received prior to the target portion, and the target portion of the second instance of the stream of audio data being prior to an appended portion of the second instance of the stream of audio data that is received subsequent to the target portion;
masking the target portion of the second instance of the stream of audio data; and
wherein processing the second instance of the stream of audio data using the global ML model to generate the predicted output comprises processing the prepended portion of the second instance of the stream of audio data and the appended portion of the second instance of the stream of audio data to generate one or more of: a predicted target portion of the second instance of the stream of audio data that is predicted to correspond to the target portion of the second instance of the stream of audio data as the predicted output, or one or more predicted features of the predicted target portion of the second instance of the stream of audio data that is predicted to correspond to the target portion of the second instance of the stream of audio data as the predicted output.

7. The method of claim 6, where generating the gradient indirectly based on the predicted output using unsupervised learning further comprises:
comparing the predicted target portion of the second instance of the stream of audio data to the target portion of the second instance of the stream of audio data; and
generating the gradient based on comparing the predicted target portion to the target portion.

8. The method of claim 6, wherein the target portion of the second instance of the stream of audio data corresponds to a target audio waveform portion of the second instance of the stream of audio data, wherein the prepended portion of the second instance of the stream of audio data that is received prior to the target portion corresponds to a prepended audio waveform portion of the second instance of the stream of audio data that is received prior to the target audio waveform portion, and wherein the appended portion of the second instance of the stream of audio data that is received subsequent to the target portion corresponds to an appended audio waveform portion of the second instance of the stream of audio data that is received subsequent to the target audio waveform portion.

9. The method of claim 6, wherein the target portion of the second instance of the stream of audio data corresponds to a target vector representation portion of the second instance of the stream of audio data, wherein the prepended portion of the second instance of the stream of audio data that is received prior to the target portion corresponds to a prepended vector representation portion of the second instance of the stream of audio data that precedes the target vector representation portion, and wherein the appended portion of the second instance of the stream of audio data that is received subsequent to the target portion corresponds to an appended vector representation portion of the second instance of the stream of audio data that follows subsequent to the target vector representation portion.

10. The method of claim 1, further comprising:
in response to receiving the stream of audio data capturing the spoken utterance of the user and prior to processing the second instance of the stream of audio data to generate the predicted output using the global ML model:
selecting one or more audio buffers to transiently store the stream of audio data, wherein selecting the one or more audio buffers to transiently store the stream of audio data is based on data received along with the stream of audio data that identifies a primary language associated with the client device or a geographical region associated with the client device.

11. The method of claim 10, wherein the global ML model utilized to generate the predicted output is specific to one or more of the primary language associated with the client device or the geographical region associated with the client device.

12. The method of claim 1, subsequent to updating the weights of the global ML model stored remotely at one or more of the remote servers, further comprising:
transmitting, to at least the client device, the global weights of the global ML model, wherein transmitting the global weights of the global ML model to the client device causes the client device to replace local weights of an on-device ML model stored locally at the client device with the global weights.

13. The method of claim 12, wherein transmitting the global weights of the global ML model to the client device is in response to determining that one or more conditions are satisfied at the client device.

14. The method of claim 13, wherein the one or more conditions comprise one or more of: that the client device is charging, that the client device has at least a threshold state of charge, that hat a temperature of the client device is less than a threshold, that the client device is not being held by the user, a particular time of day, a particular day of week, whether the global weights of the global ML model have been updated based on a threshold quantity of gradients, or whether performance of the global ML model satisfies a performance threshold.

15. The method of claim 1, wherein updating the global weights of the global ML model stored remotely at one or more of the remote servers is in response to determining that one or more conditions are satisfied at one or more of the remote servers.

16. The method of claim 15, wherein the one or more conditions comprise one or more of: a particular time of day, a particular day of week, whether a threshold quantity of gradients are available to update the global weights of the global ML model, or whether performance of the global ML model satisfies a performance threshold.

17. A method implemented by one or more processors at one or more remote servers, the method comprising:
receiving, from a plurality of client devices, a plurality of corresponding streams of audio data, each of the plurality of corresponding streams of audio data being generated by one or more corresponding microphones of a respective one of the plurality of client devices;
for each of the plurality of corresponding streams of audio data:
duplicating each of the plurality of corresponding streams of audio data to generate a corresponding first instance of each of the plurality of corresponding streams of audio data and a corresponding second instance of each of the plurality of corresponding streams of audio data;

utilizing a fulfillment pipeline to process a given one of the corresponding first instances of the corresponding streams of audio data to cause corresponding certain fulfillment to be performed; and utilizing a training pipeline to process the given one of the corresponding second instances of the corresponding streams of audio data to cause a global machine learning (ML) model stored remotely at one or more of the remote servers to be updated, wherein utilizing the training pipeline to process the given one of the corresponding second instances of the corresponding streams of audio data to cause the global ML to be updated comprises:

processing, using the global ML model, the given one of the corresponding second instances of the corresponding streams of audio data to generate predicted output; and generating, using unsupervised learning, a gradient based on the predicted output;

subsequent to causing the corresponding certain fulfillment to be performed:

discarding the given one of the corresponding first instances of the corresponding streams of audio data; and subsequent to generating the gradient based on the predicted output and using unsupervised learning:

discarding the given one of the corresponding second instances of the corresponding streams of audio data; and updating, based on the gradient, global weights of the global ML model stored remotely at one or more of the remote servers.

18. A method implemented by one or more processors at a remote server, the method comprising:

receiving, from a client device of a third-party (3P) developer, a 3P automatic speech recognition (ASR) model;

receiving, from a client device of a user, a stream of audio data capturing a spoken utterance of the user, the stream of audio data being generated by one or more microphones of the client device;

duplicating the stream of audio data to generate a first instance of the stream of audio data and a second instance of the stream of audio data;

processing the first instance of the stream of audio data to cause a certain fulfillment of the spoken utterance to be performed, wherein processing the first instance of the stream of audio data to cause the certain fulfillment of the spoken utterance to be performed comprises:

processing, using the 3P ASR model, the first instance of the stream of audio data to generate a stream of ASR data;

processing, using a natural language understanding (NLU) model, the stream of ASR data to generate a stream of NLU data; and causing the certain fulfillment of the spoken utterance to be performed based on the stream of NLU data;

while the first instance of the stream of audio data is being processed to cause the certain fulfillment of the spoken utterance to be performed:

generating, using unsupervised learning, a gradient based on the stream of ASR data;

subsequent to causing the certain fulfillment of the spoken utterance to be performed:

discarding the first instance of the stream of audio data; and subsequent to generating the gradient based on the stream of ASR data and using unsupervised learning:

discarding the second instance of the stream of audio data;

updating, based on the gradient, 3P weights of the 3P ASR model that is received from the 3P developer to generate an updated 3P ASR model; and transmitting, to the client device of the 3P developer, the updated 3P ASR model.

19. The method of claim 18, wherein transmitting the updated 3P ASR model to the client device of the 3P developer is in response to determining that one or more conditions are satisfied at the one or more remote servers, and wherein the one or more conditions comprise one or more of: a particular time of day, a particular day of week, whether a threshold quantity of gradients have been utilized to update the 3P weights of the 3P ASR model, or whether performance of the 3P ASR model satisfies a performance threshold.

* * * * *